(12) United States Patent
Kocher et al.

(10) Patent No.: US 11,072,108 B2
(45) Date of Patent: Jul. 27, 2021

(54) PATTERNED SUBSTRATES

(71) Applicants: Leroy Joseph Kocher, Sunman, IN (US); Jill Marlene Orr, Liberty Township, OH (US); Timothy Ian Mullane, Cincinnati, OH (US); Kelyn Anne Arora, Cincinnati, OH (US)

(72) Inventors: Leroy Joseph Kocher, Sunman, IN (US); Jill Marlene Orr, Liberty Township, OH (US); Timothy Ian Mullane, Cincinnati, OH (US); Kelyn Anne Arora, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 256 days.

(21) Appl. No.: 16/166,562

(22) Filed: Oct. 22, 2018

(65) Prior Publication Data

US 2019/0134882 A1 May 9, 2019

Related U.S. Application Data

(60) Provisional application No. 62/581,262, filed on Nov. 3, 2017, provisional application No. 62/583,241, filed
(Continued)

(51) Int. Cl.
*B29K 105/12* (2006.01)
*B29K 105/00* (2006.01)
(Continued)

(52) U.S. Cl.
CPC ............ *B29C 55/12* (2013.01); *B29C 53/265* (2013.01); *B29C 53/285* (2013.01);
(Continued)

(58) Field of Classification Search
CPC ..... Y10T 428/24628; Y10T 428/24661; Y10T 428/24669; Y10T 428/24678; Y10T 428/24686; Y10T 428/24694; Y10T 428/24702; Y10T 428/24711; Y10T 428/24719; Y10T 428/24727; Y10T 428/24736; Y10T 428/24942;
(Continued)

(56) References Cited

U.S. PATENT DOCUMENTS 2,059,292 A 11/1936 Taylor
5,364,171 A 11/1994 Addington et al.
(Continued)

OTHER PUBLICATIONS

Aly, A. S. et al. "The synthesis of some new derivatives derived from 1,2,3,4- 1-17 tetrahydrocyclohepteno[ 4,5]thieno [2,3-d]pyrimidine." Phosphorus, Sulfur and Silicon and the Related Elements, 2007, 182(1), p. 35-56.
(Continued)

*Primary Examiner* — Maria V Ewald
*Assistant Examiner* — Ethan A. Utt
(74) *Attorney, Agent, or Firm* — Daniel S. Albrecht; Christian M. Best

(57) ABSTRACT

Patterned substrates having a first substrate region that is incrementally mechanically stretched with corrugations and a second substrate region having a plurality of discrete unstretched portions completely surrounded by the first substrate region.

20 Claims, 14 Drawing Sheets

Related U.S. Application Data on Nov. 8, 2017, provisional application No. 62/581,270, filed on Nov. 3, 2017, provisional application No. 62/583,235, filed on Nov. 8, 2017.

(51) Int. Cl.

| | | |
|---|---|---|
| *B29C 55/12* | (2006.01) | |
| *B29C 53/26* | (2006.01) | |
| *B29C 53/28* | (2006.01) | |
| B29C 55/00 | (2006.01) | |
| B29C 55/06 | (2006.01) | |
| B29C 55/18 | (2006.01) | |
| B29C 55/04 | (2006.01) | |

(52) U.S. Cl.
CPC .......... *B29C 55/005* (2013.01); *B29C 55/045* (2013.01); *B29C 55/06* (2013.01); *B29C 55/18* (2013.01); *B29K 2105/12* (2013.01); *B29K 2105/256* (2013.01); *Y10T 428/24628* (2015.01); *Y10T 428/24669* (2015.01); *Y10T 428/24694* (2015.01)

(58) Field of Classification Search
CPC ....... Y10T 428/2495; Y10T 428/24967; Y10T 428/24975; Y10T 428/31725; Y10T 428/31728; Y10T 428/31732; Y10T 428/31736; Y10T 428/31739; Y10T 428/31743; Y10T 428/31746; Y10T 428/3175; Y10T 428/31754; Y10T 428/31757; Y10T 428/31761; Y10T 428/31765; Y10T 428/31768; Y10T 428/31772; Y10T 428/31775; Y10T 428/31779; Y10T 428/31783; Y10T 428/31855; Y10T 428/31859; Y10T 428/31862; Y10T 428/31866; Y10T 428/3187; Y10T 428/31873; Y10T 428/31877; Y10T 428/3188; Y10T 428/31884; Y10T 428/31888; Y10T 428/31891; Y10T 428/31895; Y10T 428/31899; Y10T 428/31902; Y10T 428/31906; Y10T 428/31909; Y10T 428/31913; Y10T 428/31917; Y10T 428/3192; Y10T 428/31924; Y10T 428/31928; Y10T 428/31931; Y10T 428/31935; Y10T 428/31938; B32B 3/00; B32B 3/26; B32B 3/28; B32B 2255/00; B32B 2255/02; B32B 5/00; B32B 5/02; B32B 5/022; B32B 5/04; B32B 5/08; B32B 5/14; B32B 5/142; B32B 5/145; B32B 5/18; B32B 5/22; B32B 5/24; B32B 5/245; B32B 5/26; B32B 5/28; B32B 5/32; B32B 27/00; B32B 27/02; B32B 27/06; B32B 27/065; B32B 27/08; B32B 27/10; B32B 27/12; B32B 27/18; B32B 27/20; B32B 27/30; B32B 27/306; B32B 27/32; B32B 27/327; B32B 27/34; B32B 29/00; B32B 29/002; B32B 29/007; B32B 29/02; B32B 29/08; A61F 13/00; A61F 13/15; A61F 13/15203; A61F 13/45; A61F 13/47; A61F 13/4704; A61F 13/49; A61F 13/49001; A61F 13/51; A61F 13/511; A61F 13/51104; A61F 13/51108; A61F 13/51121; A61F 13/5116; A61F 13/512; A61F 13/5123; A61F 13/5126; A61F 13/513; A61F 13/51305; A61F 13/51311; A61F 2013/51284; A61F 2013/15292; A61F 2013/15357; A61F 2013/4587; A61F 2013/51078; A61F 2013/5113; A61F 2013/51147; A61F 2013/51165; A61F 2013/51173; A61F 2013/51178; A61F 2013/51186; A61F 2013/51355; A61F 2013/51361; A61F 2013/51377; D21H 27/00; D21H 27/02; D21H 27/30; D21H 27/40
USPC ....... 428/174, 178–187, 212, 213, 215, 216, 428/218–220, 332, 337, 338–340, 428/474.4–479.6, 500–523; 604/317, 604/385.01, 385.101; 162/109, 117, 123, 162/202, 204, 205, 231
See application file for complete search history.

(56) References Cited

U.S. PATENT DOCUMENTS

| | | | |
|---|---|---|---|
| 5,384,177 A | 1/1995 | Rissmann | |
| D392,108 S * | 3/1998 | Diggins | D5/53 |
| 5,730,738 A * | 3/1998 | McFall | A61F 13/47263 604/387 |
| D399,062 S * | 10/1998 | Sporing | D5/57 |
| 5,928,764 A | 7/1999 | Onduline | |
| 5,993,431 A * | 11/1999 | McFall | A61F 13/5611 604/385.24 |
| 5,993,432 A * | 11/1999 | Lodge | A61F 13/49009 604/385.3 |
| D463,137 S * | 9/2002 | Monroe | D5/57 |
| 6,458,447 B1 * | 10/2002 | Cabell | D21F 11/006 428/167 |
| D609,923 S * | 2/2010 | Johnston | D5/61 |
| D825,939 S * | 8/2018 | Broering | D5/56 |
| D833,760 S * | 11/2018 | Zhu | D5/56 |
| D845,649 S * | 4/2019 | Zhu | D5/59 |
| D850,800 S * | 6/2019 | Fish | D5/58 |
| 2006/0093766 A1 * | 5/2006 | Savicki | B31F 1/07 428/35.2 |
| 2007/0227428 A1 * | 10/2007 | Brennan | B81C 1/00206 114/67 R |
| 2007/0228064 A1 * | 10/2007 | Brennan | A47K 10/421 221/45 |
| 2008/0217809 A1 * | 9/2008 | Zhao | A61F 13/15699 264/229 |
| 2008/0221538 A1 * | 9/2008 | Zhao | A61F 13/15707 604/367 |
| 2008/0221539 A1 * | 9/2008 | Zhao | A61F 13/533 604/378 |
| 2009/0143411 A1 | 6/2009 | Ward et al. | |
| 2010/0226943 A1 * | 9/2010 | Brennan | A41D 31/305 424/400 |
| 2011/0117307 A1 * | 5/2011 | Fraser | B32B 37/0076 428/66.6 |
| 2011/0174430 A1 * | 7/2011 | Zhao | A61F 13/15699 156/207 |
| 2011/0260371 A1 * | 10/2011 | Arora | D06P 7/005 264/495 |
| 2011/0264064 A1 * | 10/2011 | Arora | B41M 5/34 604/367 |
| 2012/0033900 A1 * | 2/2012 | Fraser | B29C 66/3452 383/105 |
| 2012/0039550 A1 * | 2/2012 | MacPherson | B32B 27/306 383/109 |
| 2012/0063706 A1 * | 3/2012 | Fraser | B29C 65/56 383/109 |
| 2012/0064271 A1 * | 3/2012 | Broering | B32B 7/05 428/35.7 |
| 2013/0011084 A1 * | 1/2013 | Broering | B32B 27/32 383/42 |
| 2013/0243982 A1 * | 9/2013 | Borchardt | B29C 55/18 428/35.2 |
| 2013/0319625 A1 * | 12/2013 | Mohammadi | B31F 1/12 162/111 |
| 2014/0119679 A1 * | 5/2014 | Cisek | B32B 37/0076 383/75 |

(56) References Cited

U.S. PATENT DOCUMENTS

| | | | | |
|---|---|---|---|---|
| 2014/0334749 A1* | 11/2014 | Borchardt | .............. | B65D 33/00 |
| | | | | 383/109 |
| 2014/0378286 A1* | 12/2014 | Borchardt | ................. | B32B 3/28 |
| | | | | 493/189 |
| 2015/0003757 A1* | 1/2015 | Wilcoxen | ............. | B65D 33/004 |
| | | | | 383/109 |
| 2015/0030266 A1* | 1/2015 | Borchardt | .............. | B30B 11/18 |
| | | | | 383/109 |
| 2015/0104121 A1* | 4/2015 | Broering | ................ | B32B 27/32 |
| | | | | 383/118 |
| 2015/0191599 A1* | 7/2015 | Cobler | .................. | B65D 81/03 |
| | | | | 428/35.5 |
| 2016/0076182 A1 | 3/2016 | Strube et al. | | |

OTHER PUBLICATIONS

Gazzar A. B. A. "Regioselective synthesis of C-nucleosides via condensation of 2-hydrazino-thia-diaza-benzo[a]azulen-4-one." Phosphorus, Sulfur and Silicon and the Related Elements, 2005, 180(1), p. 283-293.

Gazzar, A. B.A. et al. "Synthesis and reactions of polynuclear heterocycles: 1-17 azolothienopyrimidines and thienothiazolopyrimidines." Phosphorus, Sulfur and Silicon and the Related Elements, 2006, 181(12), p. 2771-2784.

International Search Report and Written Opinion, PCT/2018/056872, dated Jan. 4, 2019.

International Search Report and Written Opinion, PCT/SA2016/000013.

\* cited by examiner

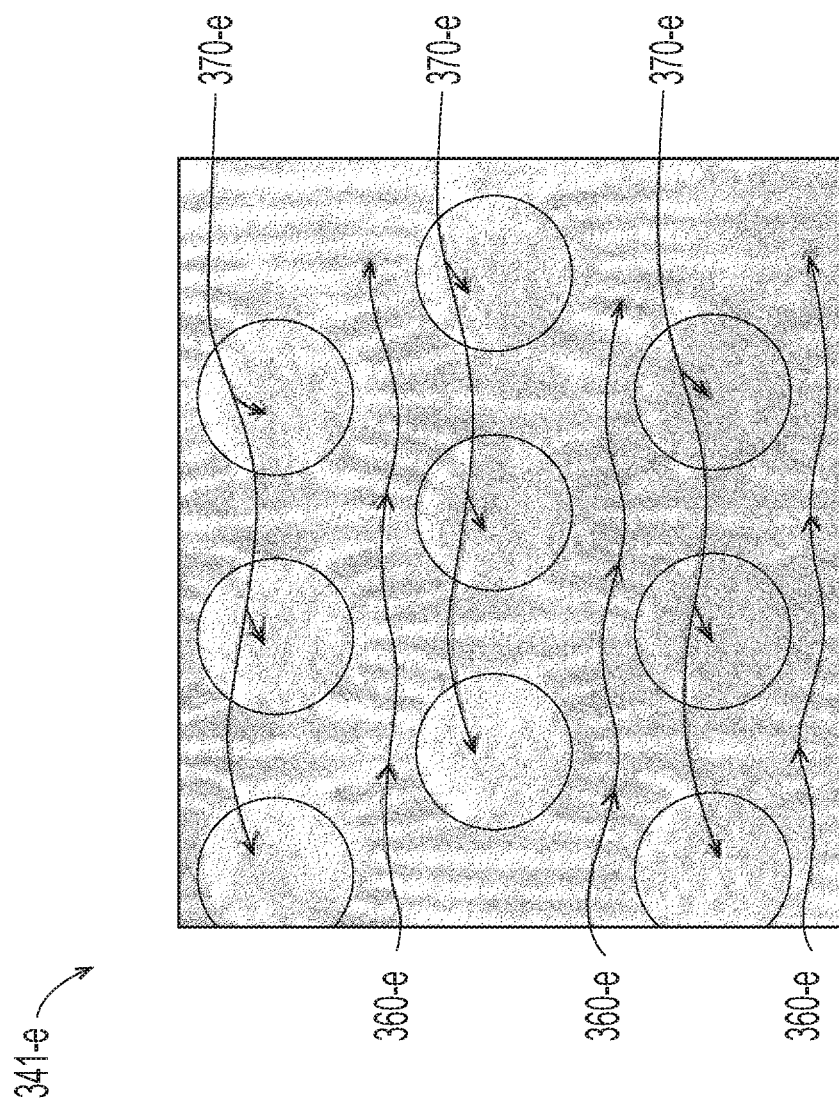

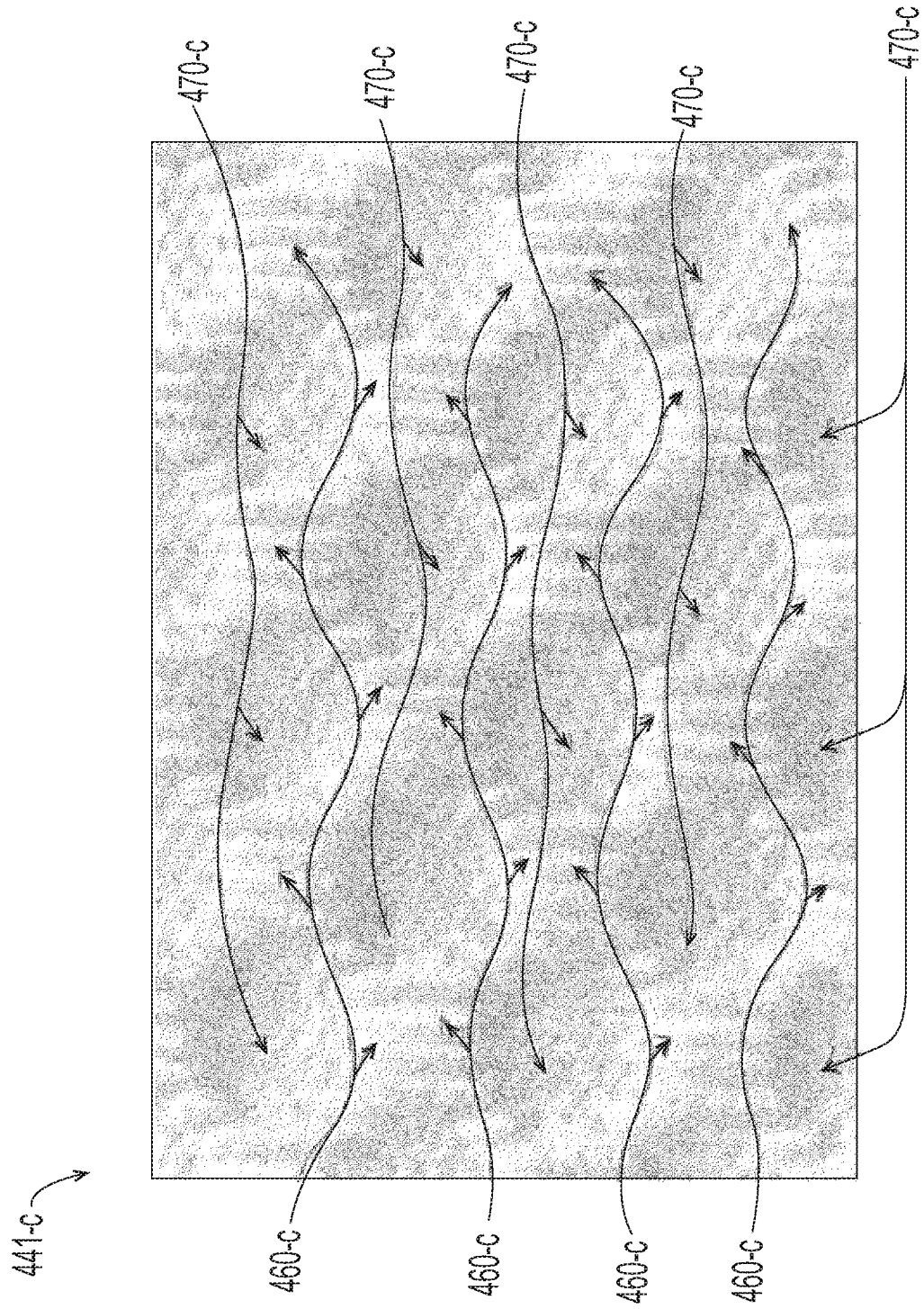

# PATTERNED SUBSTRATES

CROSS REFERENCE TO RELATED APPLICATIONS

This application claims the benefit, under 35 U.S.C. § 119(e), to U.S. Provisional Patent Application No. 62/581,262 filed on Nov. 3, 2017; U.S. Provisional Patent Application No. 62/583,241 filed on Nov. 8, 2017; U.S. Provisional Patent Application No. 62/581,270 filed on Nov. 3, 2017; and U.S. Provisional Patent Application No. 62/583,235 filed on Nov. 8, 2017, all of which are hereby incorporated by reference in their entirety.

FIELD

The present disclosure relates in general to substrates and in particular to patterned substrates made by solid state formation.

BACKGROUND

Substrates can serve as useful materials in many different articles, especially disposable consumer products. Solid state formation, such as incremental mechanical stretching, can form patterned substrates, which can be used as component materials in such articles and/or as packaging materials for such articles. Patterning by solid state formation can create improved aesthetics in the substrate. Such patterning can also affect the material properties of the substrate. Patterning by solid state formation can improve the fluid permeability of pervious substrates and can also improve the fluid acquisition of absorptive substrates. However, solid state formation can also significantly reduce the strength of the patterned substrate.

SUMMARY

However, the patterned substrates described herein provide both improved fluid handling properties and good tensile strength. These substrates include a first substrate region that is incrementally mechanically stretched with corrugations having strained and unstrained portions as well as a second substrate region having a plurality of discrete unstretched portions completely surrounded by the first substrate region. The unstretched portions at least assist in maintaining the strength of the patterned substrate, since they are distributed over and across the patterned substrate. The unstrained portions of the corrugations further assist in maintaining the strength of the patterned substrate. Where opposing ends of the corrugations are adjacent to different unstretched portions, the unstrained portions form pathways of local strength, which can help carry tensile loads between the unstretched portions. The strained portions of the corrugations at least assist in improving the fluid handling properties of pervious and/or absorptive substrates. Since the corrugations include larger strained portions in relatively wider gaps disposed at regular intervals, fluid permeability is improved over and across the patterned substrate. Thus, the patterned substrate provides both good tensile strength and improved fluid handling properties.

BRIEF DESCRIPTION OF THE DRAWINGS

FIG. 3E is a photograph illustrating an enlarged top view of a portion of a patterned substrate that is configured in the same way as the patterned substrate of FIG. 3C.

FIG. 4C is a photograph illustrating an enlarged top view of a portion of a patterned substrate that is configured in the same way as the patterned substrate of FIG. 4B.

DETAILED DESCRIPTION

The patterned substrates described herein provide both improved fluid handling properties and good tensile strength. These substrates include a first substrate region that is incrementally mechanically stretched with corrugations having strained and unstrained portions as well as a second substrate region having a plurality of discrete unstretched portions completely surrounded by the first substrate region. The unstretched portions at least assist in maintaining the strength of the patterned substrate, since they are distributed over and across the patterned substrate. The unstrained portions of the corrugations further assist in maintaining the strength of the patterned substrate. Where opposing ends of the corrugations are adjacent to different unstretched portions, the unstrained portions form pathways of local strength, which can help carry tensile loads between the unstretched portions. The strained portions of the corrugations at least assist in improving the fluid handling properties of pervious and/or absorptive substrates. Since the corrugations include larger strained portions in relatively wider gaps disposed at regular intervals, fluid permeability is improved over and across the patterned substrate. Thus, the patterned substrate provides both good tensile strength and improved fluid handling properties.

Figure 1A:
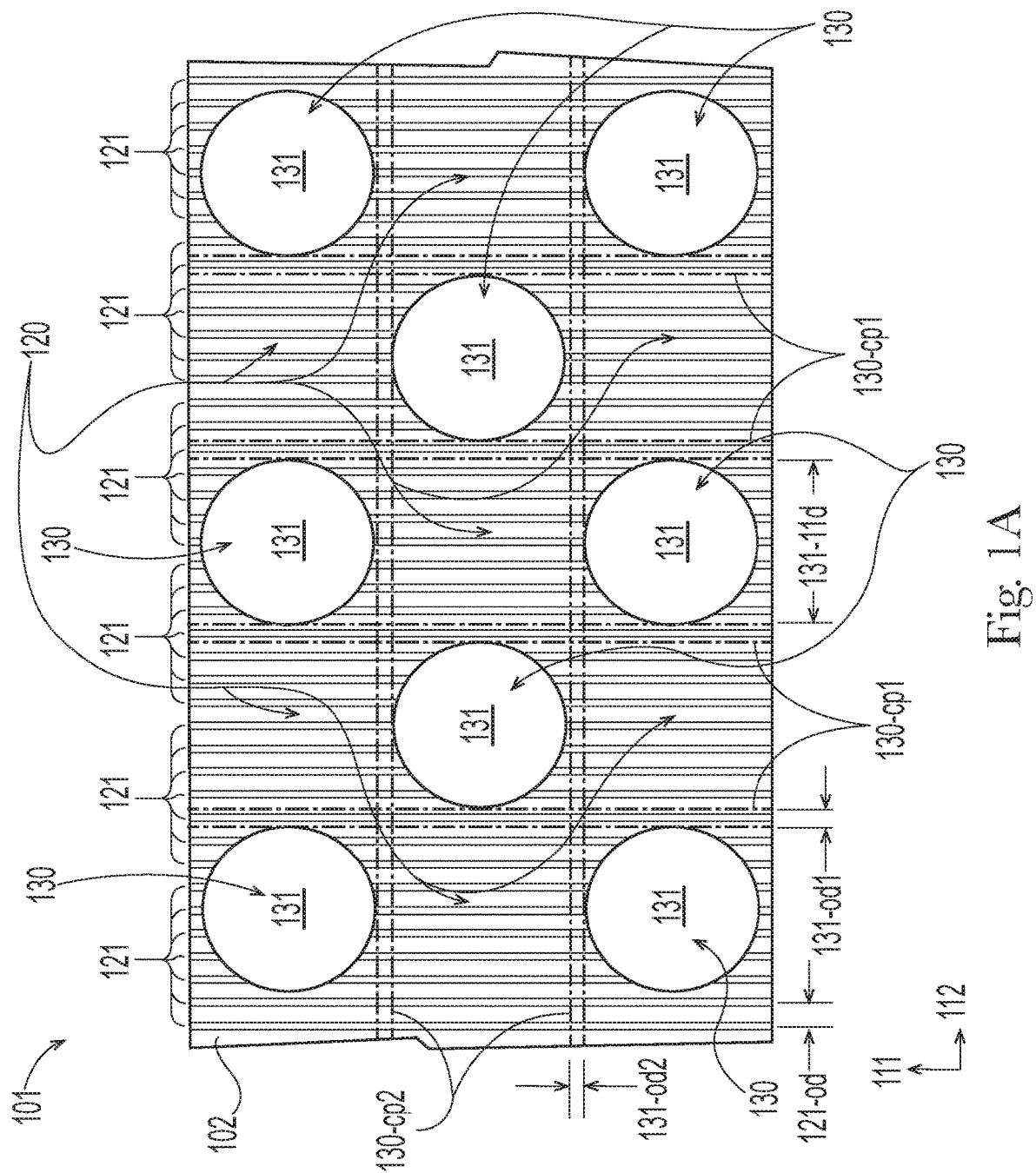
FIG. 1A is a diagram illustrating an enlarged top view of a portion of a patterning surface for making a patterned substrate having a pattern of open areas and a region of protrusion that is continuous in both primary and secondary directions.

FIG. 1A is a diagram illustrating an enlarged top view of a portion of a patterning surface 101 for making a patterned substrate. The patterning surface 101 includes a primary surface direction 111 and a secondary surface direction 112, which is perpendicular to the primary surface direction 111. The patterning surface 101 includes a first patterning region 120 and a second patterning region 130. The first patterning region 120 has a plurality of rigid, elongated protrusions 121 extending outward, perpendicular to both the primary direction 120 and the secondary direction 130 (i.e. out of the page), from an underlying support surface 102. The second patterning region 130 has a plurality of discrete open areas 131, each of which is adjacent to and completely surrounded by the protrusions 121 of the first patterning region 120. The patterning surface 101, and any of its alternative embodiments, can be mated with another patterning surface to incrementally mechanically stretch a substrate with a pattern having corrugations formed by the protrusions 121 and unstretched portions, which result from the presence of the open areas 131.

In the first patterning region 120, each of the protrusions 121 has the same cross-sectional profile and the same tip radius. Each of the protrusions has an overall shape that is linear and oriented in the primary surface direction 111. The protrusions 121 are parallel with each other and their tips are spaced apart by a uniform offset distance 121-*od*. Some of the protrusions 121 extend continuously over the portion of the patterning surface 101 while others of the protrusions 121 are discontinuous, since they are interrupted by one of the open areas 131 of the second patterning region 130.

In the second patterning region 130, each of the open areas 131 is the same size, and has an overall largest linear dimension 131-*lld*. Each of the open areas 131 has the same overall (circular) shape. Each of the open areas 131 is considered to be discrete, since it covers a defined area and does not extend continuously over the portion of the patterning surface 101. For each of the open areas 131, the open area 131 is entirely free of protrusions. The open areas 131 are arranged in rows and columns.

In each row, a plurality of the open areas 131 is uniformly arrayed in the secondary surface direction 112, across the entire portion of the patterning surface 101. The rows are parallel with each other. In adjacent rows, the open areas 131 are spaced apart from each other by rectilinear continuous portions 130-*cp*2 (illustrated as disposed between pairs of parallel reference lines), which extend across the second patterning region 130, in the secondary surface direction 112 and thus are parallel with each other. The portions of the patterning surface disposed outside of the continuous portions 130-*cp*2 are considered to be discontinuous in the secondary direction 112; these discontinuous portions are also disposed between adjacent open areas 131, in the secondary direction 112. Each of the continuous portions 130-*cp*2 has the same, uniform overall width 131-*od*2 in the primary surface direction 111; the overall width 131-*od*2 is also the offset distance between adjacent rows. The open areas 131 in adjacent rows are offset in the secondary surface direction 112, such that the rows are alternately staggered with respect to each other.

In each column, a plurality of the open areas 131 is uniformly arrayed in the primary surface direction 111, over the entire portion of the patterning surface 101. The columns are parallel with each other. In adjacent columns, the open areas 131 are spaced apart from each other by rectilinear continuous portions 130-*cp*1 (illustrated as disposed between pairs of parallel reference lines), which extend over the second patterning region 130, in the primary surface direction 111 and thus are parallel with each other. The portions of the patterning surface disposed outside of the continuous portions 130-*cp*1 are considered to be discontinuous in the primary direction 111; these discontinuous portions are also disposed between adjacent open areas 131, in the primary direction 111. Each of the continuous portions 130-*cp*1 has the same, uniform overall width 131-*od*1 in the secondary surface direction 112; the overall width 131-*od*1 is also the offset distance between adjacent columns. The open areas 131 in adjacent columns are offset in the primary surface direction 111, such that columns are alternately staggered with respect to each other.

The open areas 131 of the second patterning region 130 are related to the protrusions 121 of the first patterning region 120. Where the protrusions 121 are interrupted by one of the open areas 131, the ends of the interrupted protrusions 121 define a portion of an outer periphery of the open area 131, and each end of the interrupted protrusions 121 is considered to be adjacent to the open area 131. Some of the protrusions 121 have opposing ends adjacent to different open areas 131 while others of the protrusions 121 have only one end adjacent to an open area 131. Some of the protrusions 121, such as those disposed in the continuous portions 130-*cp*1, are not interrupted by one of the open area 131. Each of the open areas 131 is adjacent to ends of some of the protrusions 121. In the embodiment of FIG. 1A, each of the open areas 131 is adjacent to fourteen ends of the protrusions 121. Since the pattern of the protrusions 121 extends continuously around the open areas 131, the first patterning region 120 is considered to be a continuously connected region for those surrounded open areas 131. Together, the first patterning region 120 and the second patterning region 130 cover the entire portion of the patterning surface 101.

When the patterning surface 101 is mated with a second patterning surface, the patterning surfaces can be used to incrementally mechanically stretch a substrate with a pattern that results from the geometry of the mated surfaces. A second patterning surface can have a plurality of rigid, elongated protrusions configured to intermesh with the protrusions 121 of the patterning surface 101, when the surfaces are mated together by processing equipment. For example, the second patterning surface can include protrusions configured in the same way as the protrusions 121, except that all of the protrusions extend continuously over the second patterning surface. In this example, when the patterning surfaces are mated together, the protrusions 121 in the first patterning region 120 of the patterning surface 101 can intermesh with the protrusions on the second patterning surface to form incrementally mechanically stretched corrugations in a continuous first substrate region, having size, shape, and location based on the first patterning region 120, while the open areas 131 in the second patterning region 130 do not intermesh with the protrusions on the second patterning surface, leaving discrete unstretched portions in a second substrate region, having size, shape, and location based on the second patterning region 130. Alternatively, one could mate a non-patterned deformable roll, such as a rubber emboss roll, to the patterning surface 101 to incrementally mechanically stretch the substrate. For many kinds of substrate, since incremental mechanical stretching tends to increase the size of the substrate in one or more directions (e.g. perpendicular to the overall orientations of the protrusions), in embodiments of the example described above, the size of the first substrate region will tend to be larger (in a substrate direction that corresponds with the secondary direction of the patterning surface) than the size of the first patterning region 120, and the overall size of such a patterned substrate will be larger (in that direction) than the overall size of the original (unpatterned) substrate.

Figure 2A:
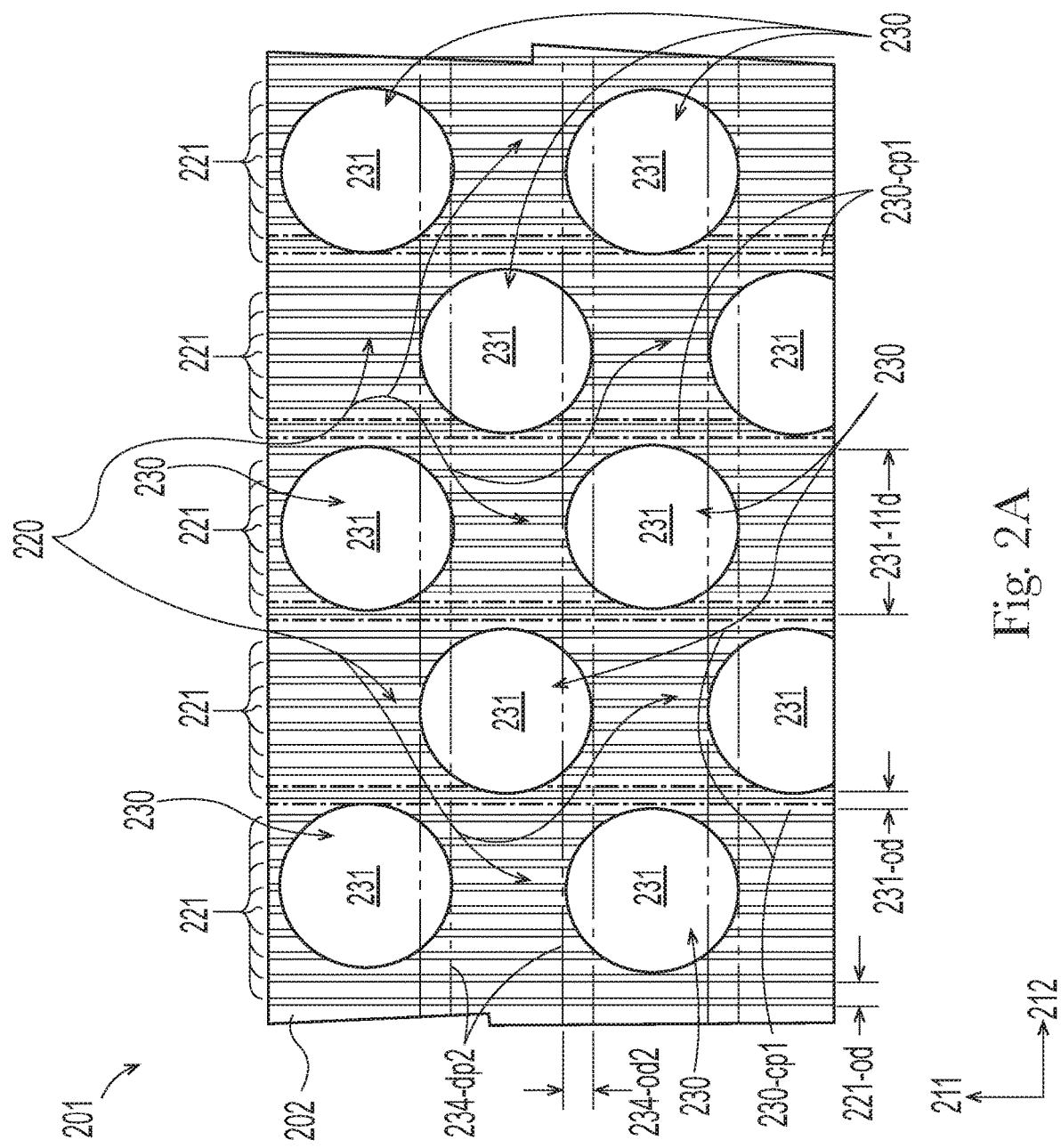
FIG. 2A is a diagram illustrating an enlarged top view of a portion of a patterning surface for making a patterned substrate having a pattern of open areas and a region of protrusion that is continuous in a primary direction but discontinuous in a secondary direction.
Figure 3A:
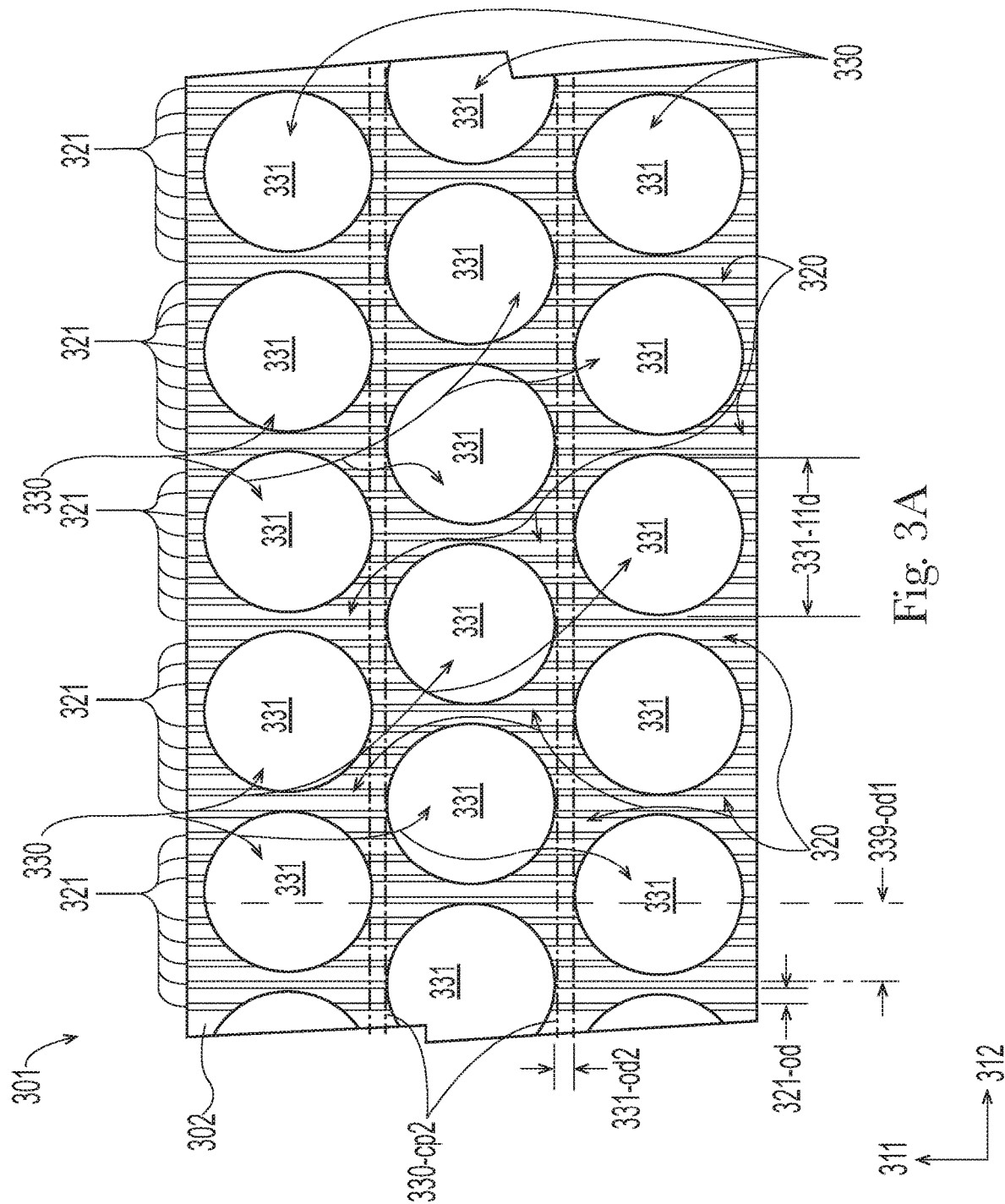
FIG. 3A is a diagram illustrating an enlarged top view of a portion of a patterning surface for making a patterned substrate having a pattern of open areas and a region of protrusion that is discontinuous in a primary direction but continuous in a secondary direction.
Figure 4A:
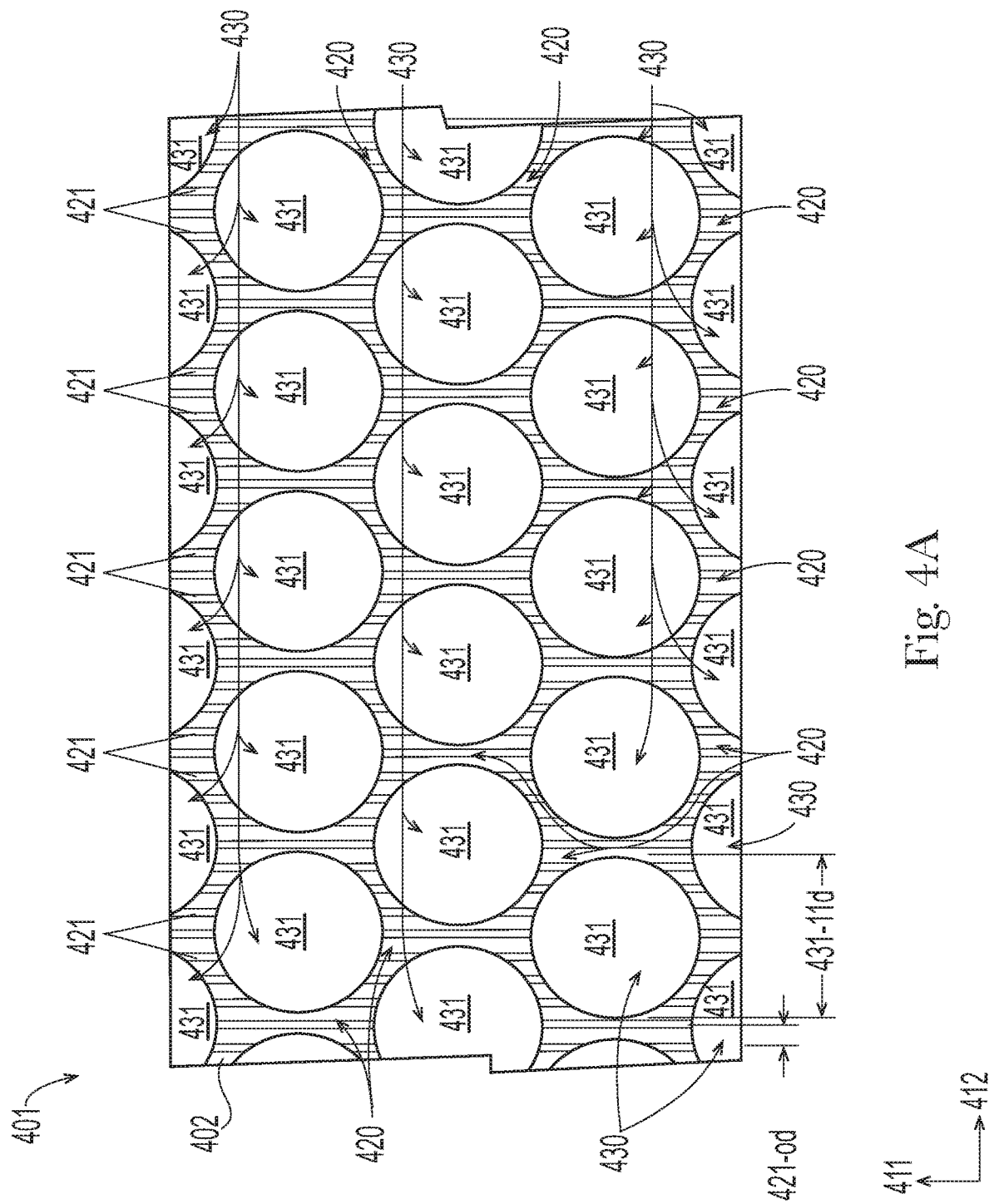
FIG. 4A is a diagram illustrating an enlarged top view of a portion of a patterning surface for making a patterned substrate having a pattern of open areas and a region of protrusion that is discontinuous in both primary and secondary directions.
Figure 4B:
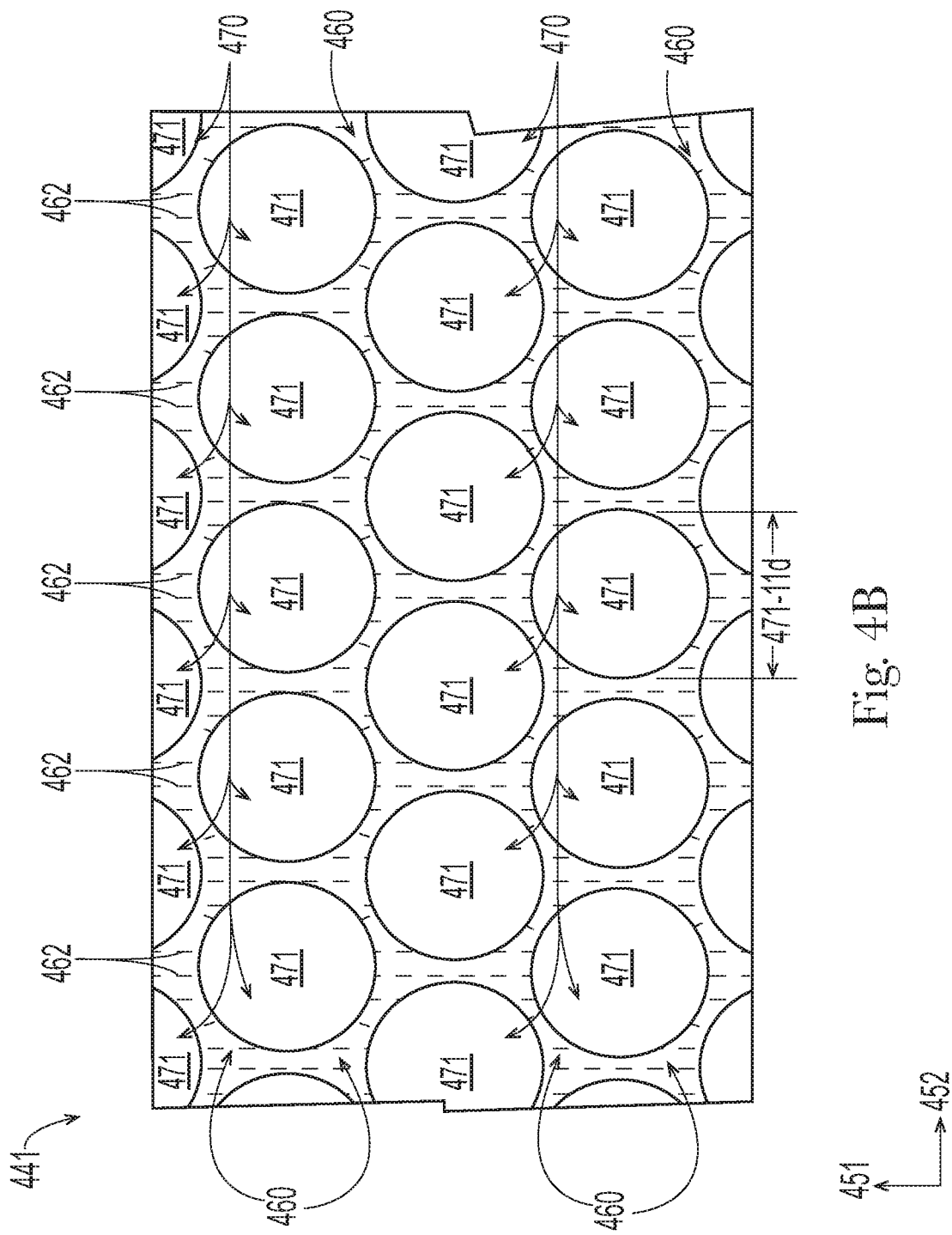
FIG. 4B is a diagram illustrating an enlarged top view of a portion of a patterned substrate made by the patterning surface of FIG. 4A, the substrate having a pattern of unstretched portions and an incrementally mechanically stretched region that is discontinuous in both primary and secondary directions.

Any embodiment of any of the patterning surfaces disclosed herein, including the patterning surface 101 of FIG. 1A, the patterned substrate 201 of FIG. 2A, the patterned substrate 301 of FIG. 3A, and the patterned substrate 401 of FIG. 4B (and any of their alternative embodiments) can be configured in any of the following ways in any workable combination. A patterning surface can be made from any suitable material(s) disclosed herein or known in the art for making a patterning surface, such as metal (e.g. aluminum) or plastic. A patterning surface (e.g. support surface and protrusions) can be formed as a unitary structure, an assembled structure, or any combination of any of these. A patterning surface can be made by any suitable fabrication process disclosed herein or known in the art, such as casting, molding, additive manufacturing, subtractive machining, or any other fabrication process known in the art, or any combination of any of these. A patterning surface can be formed on part, parts, or all of a flat plate, a curved face (e.g. roll face of a cylindrical roll), or any other shape that is useful for making patterned substrates, as described herein.

The primary and secondary surface directions of patterning surfaces can be disposed in any workable orientation with respect to processing equipment that uses the patterning surfaces to form patterned substrates. As examples, in embodiments wherein a patterning surface is formed on the curved outside face of a roll, the primary direction of the patterning surface can be aligned to a machine direction for the roll (i.e. perpendicular to an axis of rotation for the roll), or can be aligned to a cross direction for the roll (i.e. parallel with the axis of rotation), or can be aligned at any (positive or negative) angle with respect to the machine direction and/or the cross direction (e.g. 1-89°, or any integer angle from 1-89°, or any range formed by any of these angles). The primary and secondary surface directions of patterning surfaces can also be disposed in any workable orientation with respect to the substrate being patterned.

The protrusions of a patterning surface can be configured in any manner disclosed herein or known in the art for incrementally mechanically stretching a substrate. The protrusions can take any convenient form, such as discrete or continuous teeth, rings, ridges, projections, male elements, forming members, etc. which can be separated from each other by any convenient form of geometry, such as discrete or continuous cavities, depressions, grooves, recesses, forming spaces, etc. Any of the protrusions can have any suitable overall size, tip size, cross-sectional shape, tip shape, orientation, and configuration, which may be similar to, the same as, or different from some or all of the other protrusions. Protrusions can be disposed on a patterning surface in any number, in any suitable array, pattern, or arrangement with respect to each other. Part, parts, or all of some or all of the protrusions can be spaced apart at offset distances that are the same or differing, uniform or varying. As examples, protrusions can be spaced apart tip-to-tip with an offset distance (e.g. pitch) of 0.5-4 millimeters, or any value in increments of 0.5 between 0.5 and 4 millimeters, or any range formed by any of these values, such as 1-3.5 millimeters, 1.5-2.5 millimeters, etc. Some or all of the protrusions can be configured in the same manner or in different manners over part, parts, or all of a patterning surface.

The open areas of a patterning surface can be configured in any manner disclosed herein or known in the art for providing unstretched portions within a portion of a substrate that is incrementally mechanically stretched. The open areas can take any convenient form, such as areas where no protrusions are formed in the patterning surface, areas where protrusions were formed but partially removed so as to be non-intermeshing when the patterning surfaces are mated together, areas where protrusions were formed but completely removed, areas where part, parts, or all of the support surface is lower than upper portions of some or all protrusions, areas where part, parts, or all of the support surface is lower than the bases of some or all protrusions, areas where there are large depressions or openings in the support surface, or any workable combination of any of these. Any of the open areas can have any suitable size, shape, orientation, and configuration, which may be similar to, the same as, or different from some or all of the other open areas in a row, in a column, or elsewhere on the patterning surface. Regarding size, in some embodiments, an open area may have an overall largest linear dimension that is 2-30 times larger than the average offset distance of protrusions that are adjacent to that open area; in particular, the overall largest linear dimension may be 3-25 times larger, 4-20 times larger, 5-15 times larger, etc. As further examples, an open area may have an overall largest linear dimension of 5-40 millimeters, or any integer value for millimeters between 5 and 50, or any range formed by any of these values, such as 5-30 millimeters, 6-25 millimeters, 7-20 millimeters, 8-15 millimeters, etc. Regarding shape, in various embodiments, part, parts, or all of an open area may have an overall shape corresponding with any known geometric shape (e.g. circle, oval, triangle, square, trapezoid, diamond, rhombus, rectangle, polygon with five or more sides, chevron, ring, arrow, etc.) or with any shape associated with common symbols (e.g. sun, moon, stars, clouds, people, faces, hearts, plants, flowers, animals, etc.). Regarding configuration, in various embodiments, an open area may be adjacent to various numbers of ends of protrusions; for example, an open area may be adjacent to 4-30 ends, or any number of ends between 4 and 30. Also regarding configuration, part, parts, or all of an open area can be free of protrusions; as a first example, an open area can be free of protrusions throughout the entire area within its periphery, as a second example, an open area can be free of protrusions around its entire periphery, while part or parts of a middle of the open area may not be free of protrusions. Open areas can be disposed on a patterning surface in any number, in any suitable array, pattern, or arrangement with respect to each other, in any row, column, or other location on the surface. Part, parts, or all of some or all of the open areas, either individually, or by rows, or by columns, can be spaced apart at offset distances that are the same or different, uniform or varying, wherein such offset distances may or may not form rectilinear continuous portions in the primary direction, the secondary direction, and/or any other direction on the patterning surface. Some or all of the open areas can be configured in the same manner or in different manners over part, parts, or all of a patterning surface.

The patterning surfaces can be mated together to incrementally stretch a substrate in any manner disclosed herein or known in the art. The protrusions of the patterning surfaces can be positioned and engaged with respect to each other, such that the intermeshing protrusions have any convenient spacing and depth of engagement.

Figure 1B:
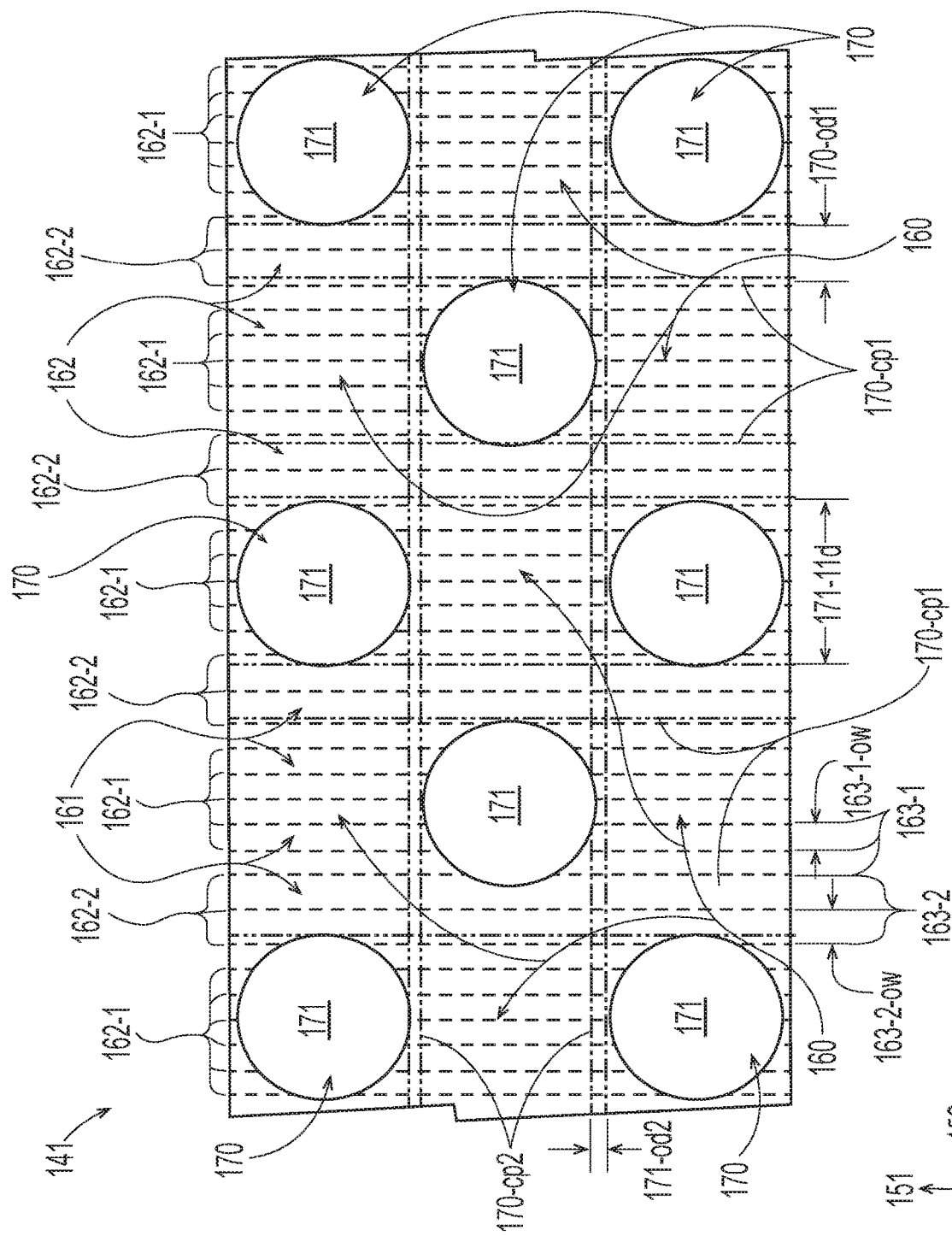
FIG. 1B is a diagram illustrating an enlarged top view of a portion of a patterned substrate made by the patterning surface of FIG. 1A, the substrate having a pattern of unstretched portions and an incrementally mechanically stretched region that is continuous in both primary and secondary directions.

FIG. 1B is a diagram illustrating an enlarged top view of a portion of a patterned substrate 141 made by the patterning surface 101 of FIG. 1A and a second patterning surface, as described above. (The patterning surface 101 of FIG. 1A is described below as a first patterning surface.) The patterned substrate 141, and any of its alternative embodiments, can be used as a component material in various articles and/or as a packaging material for various articles, in any way described herein or known in the art.

The patterned substrate 141 includes a primary substrate direction 151 and a secondary substrate direction 152, which is perpendicular to the primary substrate direction 151. The primary substrate direction 151 is oriented in the same direction as the primary surface direction of the patterning surfaces that form the patterned substrate 141, when the patterning surfaces are mated together. The secondary substrate direction 152 is oriented in the same direction as the secondary surface direction of the patterning surfaces that form the patterned substrate 141, when the patterning surfaces are mated together.

The patterned substrate 141 includes a first substrate region 160 and a second substrate region 170. The first substrate region 160 has a plurality of elongated, incrementally stretched corrugations 161, which are formed by the protrusions 121 of the first patterning surface 101 intermeshing with protrusions of the second patterning surface when the patterning surfaces are mated together. So, the first substrate region 160 is based on the first patterning region 120 of the first patterning surface 101. Each of the corrugations 161 also has a trough and a crest. The trough, which is formed by the intermeshing protrusions that are oriented downward, is the lowest portion of the corrugation 161 taken continuously along its length. The crest, which is formed by the intermeshing protrusions that are oriented upward, is the highest portion of the corrugation 161 taken continuously along its length. Each of the corrugations 161 includes substantially strained portions, which are thinned and elongated, disposed between adjacent troughs and crests. Each of the corrugations 161 also includes substantially unstrained portions, which are compressed but maintained at substantially the same basis weight, disposed along each trough and crest. Since each of the corrugations 161 includes both strained portions and unstrained portions, the corrugations 161 are considered to be incrementally mechanically stretched.

The crests of the corrugations 161 include first crests 162-1 and second crests 162-2. Since the corrugations 161 are substantially straight, the first crests 162-1 and the second crests 162-2 are also substantially straight. The first crests 162-1 and the second crests 162-2 are shown in FIG. 1B as dashed lines oriented in the primary substrate direction 151. Some of the second crests 162-2 extend continuously over the portion of the patterned substrate 141 while others of the second crests 162-2 along with the first crests 16201 are discontinuous, since they are interrupted by one of the unstretched portions 171 of the second substrate region 170.

The first crests 162-1 and the second crests 162-2 are separated from each other by gaps of differing sizes, wherein each gap has an overall width measured linearly in the secondary direction 152. The first crests 162-1 are separated from each other by relatively narrower gaps 163-1, each of which has a first overall width 163-1-$ow$ that is substantially uniform. The second crests 162-2 are separated from each other by relatively wider gaps 163-2, each of which has a second overall width 163-2-$ow$ that is substantially uniform. In various embodiments, the second overall width 163-2-$ow$ can be 25-300% greater than the first overall width 163-1-$ow$. At least some of the crests 162-2 have (on one side) a first adjacent gap that is one of the relatively narrower gaps 163-1 and (on the other side) a second adjacent gap that is one of the relatively wider gaps 163-2.

The second substrate region 170 has a plurality of discrete unstretched portions 171, each of which is adjacent to and completely surrounded by the corrugations 161 of the first substrate region 160. The unstretched portions 171 are formed by the open areas 131 of the first patterning surface 101 having no intermeshing protrusions when the patterning surfaces are mated together. So, the second substrate region 170 is based on the second patterning region 130 of the first patterning surface 101.

In the second substrate region 170, each of the unstretched portions 171 is the same size, and has an overall largest linear dimension 171-$lld$. Each of the unstretched portions 171 has the same overall (circular) shape. Each of the unstretched portions 171 is considered to be discrete, since it covers a defined area and does not extend continuously over the portion of the patterned substrate 141. For each of the unstretched portions 171, the unstretched portion 171 is entirely free of any corrugations 161. The unstretched portions 171 are arranged in rows and columns.

In each row, a plurality of the unstretched portions 171 is uniformly arrayed in the secondary substrate direction 152, across the entire portion of the patterned substrate 141. The rows are parallel with each other. In adjacent rows, the unstretched portions 171 are spaced apart from each other by rectilinear continuous portions 170-$cp2$ (illustrated as disposed between pairs of parallel reference lines), which extend across the second substrate region 170, in the secondary substrate direction 152 and thus are parallel with each other. The portions of the patterned substrate disposed outside of the continuous portions 170-$cp2$ are considered to be discontinuous in the secondary direction 152; these discontinuous portions are also disposed between adjacent unstretched portions 171, in the secondary direction 152. Each of the continuous portions 170-$cp2$ has the same, uniform overall width 171-$od2$ in the primary substrate direction 151; the overall width 171-$od2$ is also the offset distance between adjacent rows. The unstretched portions 171 in adjacent rows are offset in the secondary substrate direction 152, such that the rows are alternately staggered with respect to each other.

In each column, a plurality of the unstretched portions 171 is uniformly arrayed in the primary substrate direction 151, over the entire portion of the patterned substrate 141. The columns are parallel with each other. In adjacent columns, the unstretched portions 171 are spaced apart from each other by rectilinear continuous portions 170-$cp1$ (illustrated as disposed between pairs of parallel reference lines), which extend over the second substrate region 170, in the primary substrate direction 151 and thus are parallel with each other.

The portions of the patterned substrate disposed outside of the continuous portions 170-*cp*1 are considered to be discontinuous in the primary direction 151; these discontinuous portions are also disposed between adjacent unstretched portions 171, in the primary direction 151. Each of the continuous portions 170-*cp*1 has the same, uniform overall width 171-*od*1 in the secondary substrate direction 152; the overall width 170-*od*1 is also the offset distance between adjacent columns. The unstretched portions 171 in adjacent columns are offset in the primary substrate direction 151, such that columns are alternately staggered with respect to each other.

The unstretched portions 171 of the second substrate region 170 are related to the crests 162-1 and 162-2 of the corrugations 161 of the first substrate region 160. Where the crests 162-1 and 162-2 of the corrugations 161 are interrupted by one of the unstretched portions 171, the ends of the interrupted crest 162-1 and 162-2 define a portion of an outer periphery of the unstretched portion 171, and each end of the interrupted crests 162-1 and 162-2 is considered to be adjacent to the unstretched portion 171. Some of the crests 162-1 and 162-2 have opposing ends adjacent to different unstretched portions 171 while others of the crests 162-1 and 162-2 have only one end adjacent to an unstretched portion 171. Some of the crests 162-2, such as those disposed in the continuous portions 170-*cp*1, are not interrupted by one of the unstretched portions 171. Each of the unstretched portions 171 is adjacent to ends of some of the crests 162-1 and 162-2. In the embodiment of FIG. 1A, each of the unstretched portions 171 is adjacent to fourteen ends of the crests 162-1 and 162-2. Since the pattern of the corrugations 161 extends continuously around the unstretched portions 171, the first substrate region 160 is considered to be a continuously connected region for those surrounded unstretched portions 171. Together, the first substrate region 160 and the second patterning region 170 cover the entire portion of the patterned substrate 141.

The unstretched portions 171 of the second substrate region 170 are also related to the gaps disposed between the crests 162-1 and 162-2 of the corrugations 161 of the first substrate region 160. Where part, parts, or all of any of the corrugations 161 are interrupted by one of the unstretched portions 171, the unstretched portions 171 have at least partially constrained the incremental mechanical stretching in the secondary direction 152, such that, for the corrugations 161 partially or fully disposed outside of the continuous portions rectilinear continuous portions 170-*cp*1, the corrugations are relatively narrower in the secondary direction 152, so the first crests 162-1 are separated from each other by the relatively narrower gaps 163-1. By contrast, where part, parts, or all of any of the corrugations 161 are not interrupted by one of the unstretched portions 171, the unstretched portions 171 have not substantially constrained the incremental mechanical stretching in the secondary direction 152, such that, for the corrugations 161 partially or fully disposed inside of the continuous portions rectilinear continuous portions 170-*cp*1, the corrugations are relatively wider in the secondary direction 152, so the second crests 162-2 are separated from each other by the relatively wider gaps 163-2.

The corrugations 161, the gaps 163-1 and 163-2, and the unstretched portions 171 affect the overall material properties of the patterned substrate 141. The unstretched portions 171 at least assist in maintaining the strength of the patterned substrate 141, since they are distributed in both the primary direction 151 and the secondary direction 152, over and across the patterned substrate 141. The unstrained portions of the corrugations 161 further assist in maintaining the strength of the patterned substrate 141, especially where some of the crests 162-1 and 162-2 of the corrugations 161 have opposing ends adjacent to different unstretched portions 171; the unstrained portions of these crests can act like ligaments that form pathways of local strength, which can help carry tensile loads between the unstretched portions 171. The strained portions of the corrugations 161, which are disposed in the gaps 163-1 and 163-2 at least assist in improving the fluid permeability of pervious substrates (e.g. fibrous substrates, such as nonwovens). In particular, the relatively wider gaps 163-2 have relatively larger strained portions, in which the patterned substrate 141 is thinned to an even greater degree, which allows fluids (e.g. liquids and/or gases) to pass through the patterned substrate 141 more easily. Since the crests 162-2 with the relatively wider gaps 163-2 are continuous in the primary direction 151 and are disposed at regular intervals in the secondary direction 152, the fluid permeability of the patterned substrate 141 is improved over and across the patterned substrate 141. Thus, the patterned substrate 141 provides both tensile strength and fluid permeability, wherein each of these properties can be increased or decreased in various ways, as noted below.

Any embodiment of any of the patterned substrates disclosed herein, including the patterned substrate 141 of FIG. 1B (and any of its alternative embodiments) can be configured according to any results from using the patterning surface 101 of FIG. 1A (and any of its alternative embodiments) for any kind of substrate disclosed herein or known in the art.

Figure 2B:
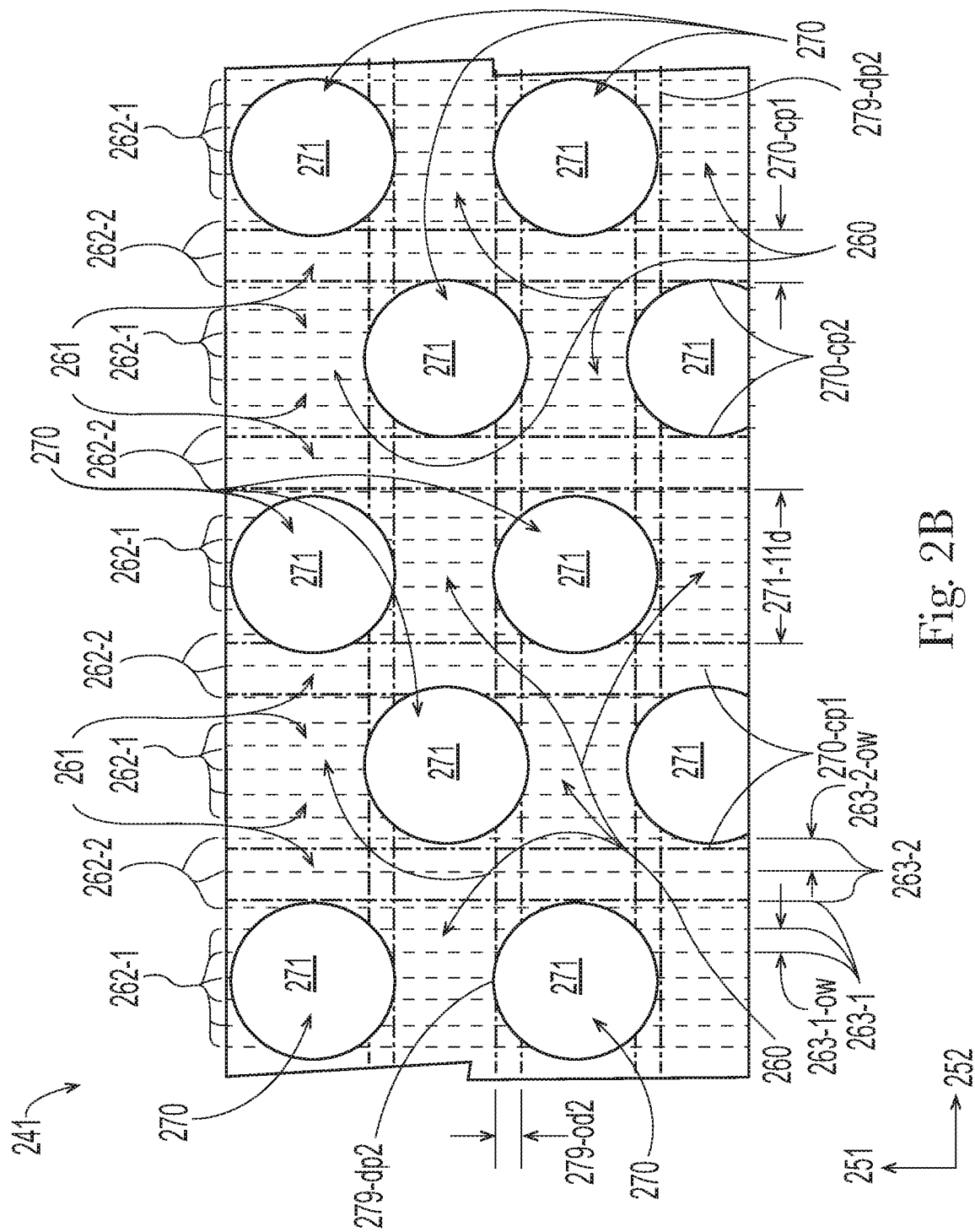
FIG. 2B is a diagram illustrating an enlarged top view of a portion of a patterned substrate made by the patterning surface of FIG. 2A, the substrate having a pattern of unstretched portions and an incrementally mechanically stretched region that is continuous in a primary direction but discontinuous in a secondary directions.
Figure 3B:
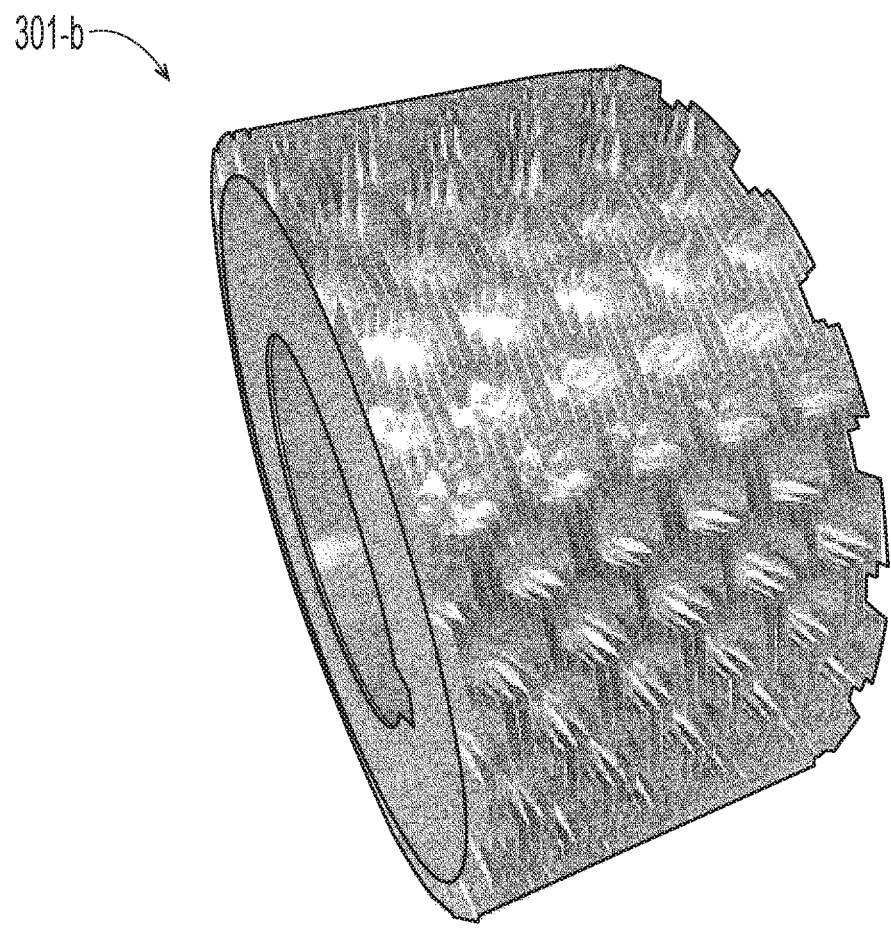
FIG. 3B is a photograph of a cylindrical solid state formation roll having a patterning surface similar to the patterning surface of FIG. 3A disposed on its curved roll face.
Figure 3C:
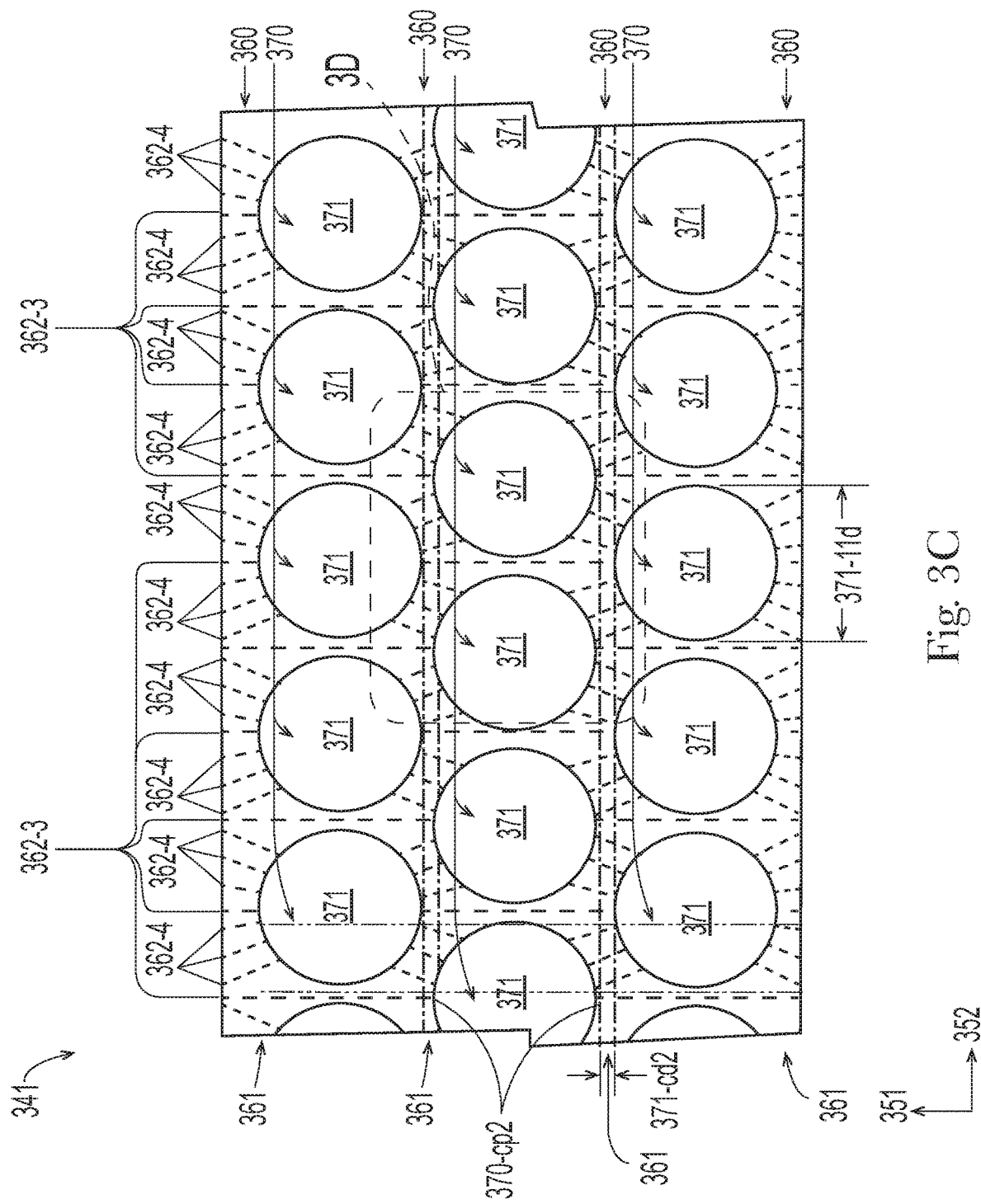
FIG. 3C is a diagram illustrating an enlarged top view of a portion of a patterned substrate made by the patterning surface of FIG. 3A, the substrate having a pattern of unstretched portions and an incrementally mechanically stretched region that is discontinuous in a primary direction but continuous in a secondary directions.

And, any embodiment of any of the patterned substrates disclosed herein, including the patterned substrate 141 of FIG. 1B, the patterned substrate 241 of FIG. 2B, the patterned substrate 341 of FIG. 3C, and the patterned substrate 441 of FIG. 4B (and any of their alternative embodiments) can be configured in any of the following ways in any workable combination. A patterned substrate can be made from any suitable material(s) disclosed herein or known in the art for being incrementally mechanically stretched, such as films, nonwovens, airlaid fibrous structures, wetlaid fibrous structures, foams, and combinations of any of these, such as laminates and composites. Part, parts, or all of a patterned substrate can be made from the same material or made from two or more different materials. A patterned substrate can be incrementally mechanically stretched by any suitable solid state formation process disclosed herein or known in the art. Part, parts, or all of a patterned substrate can be further processed, shaped, modified, and/or treated in any manner known in the art for using the patterned substrate as a component material in an article and/or as a packaging material for an article, as described herein.

The primary and secondary substrate directions of patterned substrates can be disposed in any workable orientation with respect to the original substrate being patterned. The primary and secondary substrate directions of patterned substrates can also be disposed in any workable orientation with respect to processing equipment that uses patterning surfaces to form patterned substrates. As examples, in embodiments wherein a patterned substrate is formed by a patterned surface on the curved outside face of a roll, the primary direction of the patterned substrate can be aligned to a machine direction for the roll (i.e. perpendicular to an axis of rotation for the roll), or can be aligned to a cross direction for the roll (i.e. parallel with the axis of rotation), or can be aligned at any (positive or negative) angle with respect to the machine direction and/or the cross direction (e.g. 1-89°, or any integer angle from 1-89°, or any range formed by any of these angles). The primary and secondary substrate directions of patterned substrates can further be disposed in any workable orientation with respect to an article into which the substrate is incorporated as a component material or onto which the substrate is incorporated as a packaging material.

The corrugations of a patterned substrate (and the crests of the corrugations) can be configured in any manner disclosed herein or known in the art for incrementally mechanically stretching a substrate. The corrugations (and their crests) can take any convenient form, such as discrete or continuous ridges, tufts, tent-shaped projections, etc., wherein none, some, or all of the corrugations may include one or more apertures through the substrate as a result of the incremental mechanical stretching. Any of the corrugations (and any of their crests) can have any suitable overall size, shape, orientation, and configuration, which may be similar to, the same as, or different from some or all of the other corrugations. Corrugations (and their crests) can be disposed on a patterned substrate in any number, in any suitable array, pattern, or arrangement with respect to each other. Part, parts, or all of some or all of the crests of the corrugations can be separated from each other by gaps that are the same or differing, uniform or varying. As examples, crests can be spaced apart by a gap having an overall width (measured linearly, crest-to-crest) of 0.5-10 millimeters, or any value in increments of 0.5 between 0.5 and 10 millimeters, or any range formed by any of these values, such as 1-6 millimeters, 1.5-2.5 millimeters, etc. In various embodiments, the crests of some corrugations can be separated by gaps of differing size. As a first example, a first gap can have an overall width, and a second gap can have an overall width that is 25-300% greater than the first overall width, or greater by any integer percentage between 25% and 300%, or any range formed by any of these values, such as 30-250%, 35-200%, 40-150%, 50-100%, etc. Some or all of the corrugations (and their crests) can be configured in the same manner or in different manners over part, parts, or all of a patterned substrate.

The unstretched portions of a patterned substrate can be configured in any manner disclosed herein or known in the art. The unstretched portions can take any convenient form, such as portions where no post-processing formations are present in the substrate, portions where no corrugations are formed in the substrate, portions where there are some post-processing formations in the substrate but such formations do not include stretching, portions where there are some post-processing formations in the substrate but some formations do not include incremental mechanical stretching, or any workable combination of any of these. Any of the unstretched portions can have any suitable size, shape, orientation, and configuration, which may be similar to, the same as, or different from some or all of the other unstretched portions in a row, in a column, or elsewhere on the patterned substrate. Regarding size, in some embodiments, an unstretched portion may have an overall largest linear dimension that is 2-30 times larger than the average offset distance between the crests of corrugations that are adjacent to that unstretched portion; in particular, the overall largest linear dimension may be 3-25 times larger, 4-20 times larger, 5-15 times larger, etc. As further examples, an unstretched portion may have an overall largest linear dimension of 5-40 millimeters, or any integer value for millimeters between 5 and 40, or any range formed by any of these values, such as 5-30 millimeters, 6-25 millimeters, 7-20 millimeters, 8-15 millimeters, etc. Regarding shape, in various embodiments, part, parts, or all of an unstretched may have an overall shape corresponding with any known geometric shape (e.g. circle, oval, triangle, square, trapezoid, diamond, rhombus, rectangle, polygon with five or more sides, chevron, ring, arrow, etc.) or with any shape associated with common symbols (e.g. sun, moon, stars, clouds, people, faces, hearts, plants, flowers, animals, etc.). Regarding configuration, in various embodiments, an unstretched portion may be adjacent to various numbers of ends of corrugations; for example, an unstretched portion may be adjacent to 4-30 ends, or any number of ends between 4 and 30. Also regarding configuration, part, parts, or all of an unstretched portion can be free of corrugations; as a first example, an unstretched portion can free of corrugations throughout the entire area within its periphery, as a second example, an unstretched portion can be free of protrusions around its entire periphery, while part or parts of a middle of the unstretched portion may not be free of corrugations. Unstretched portions can be disposed on a patterned substrate in any number, in any suitable array, pattern, or arrangement with respect to each other, in any row, column, or other location on the substrate. Part, parts, or all of some or all of the unstretched portions, either individually, or by rows, or by columns, can be spaced apart at offset distances that are the same or different, uniform or varying, wherein such offset distances may or may not form rectilinear continuous portions in the primary direction, the secondary direction, and/or any other direction on the patterned substrate. In some embodiments, offset distance may be 10-300% of the overall largest linear dimension of either or both of the unstretched portions; for example, the offset distance may be 25-200% or 50-100% of the overall largest linear dimension(s). As further examples, an offset distance between unstretched portions may be 1-50 millimeters, or any integer value for millimeters between 1 and 50, or any range formed by any of these values, such as 2-40 millimeters, 3-30 millimeters, 4-20 millimeters, 5-15 millimeters, etc. Part, parts, or all of some or all of the unstretched portions, either individually, or by rows, or by columns, may overlap at overlap distances that are the same or different, uniform or varying, wherein such overlap distances may or may not form rectilinear overlap portions in the primary direction, the secondary direction, and/or any other direction on the patterned substrate. Part, parts, or all of some or all of the unstretched portions, either individually, or by rows, or by columns, may not be spaced apart at offset distances and/or may not be overlapping at overlap distances. Some or all of the unstretched portions can be configured in the same manner or in different manners over part, parts, or all of a patterned substrate.

The corrugations, gaps, and unstretched portions can be configured in various ways to provide particular material properties in a patterned substrate, including tensile strength and fluid permeability. The tensile strength of a patterned substrate can usually be increased by creating a pattern having: larger unstretched portions, a greater number of unstretched portions, unstretched portions that are separated by smaller offset distances, unstretched portions that are distributed more densely, second substrate regions that cover a greater percentage of the patterned substrate, or any combination of these. The tensile strength of a patterned substrate can also usually be increased by creating a pattern of corrugations: with less deformation in the substrate, with stronger pathways of unstrained portions between unstretched portions, or both. The fluid permeability of a patterned substrate can usually be increased by creating a pattern of corrugations that: creates more deformation in the substrate, covers a larger percentage of the patterned substrate, has larger gaps between crests, or any combination of these. In general, designs choices that increase tensile strength often reduce fluid permeability and design choices that increase fluid permeability often reduce tensile strength; however, one skilled in the art can select particular design choices for patterning surfaces to make patterned substrates according to the present disclosure, wherein the patterned substrates appropriately balance tensile strength and fluid permeability.

Figure 1C:
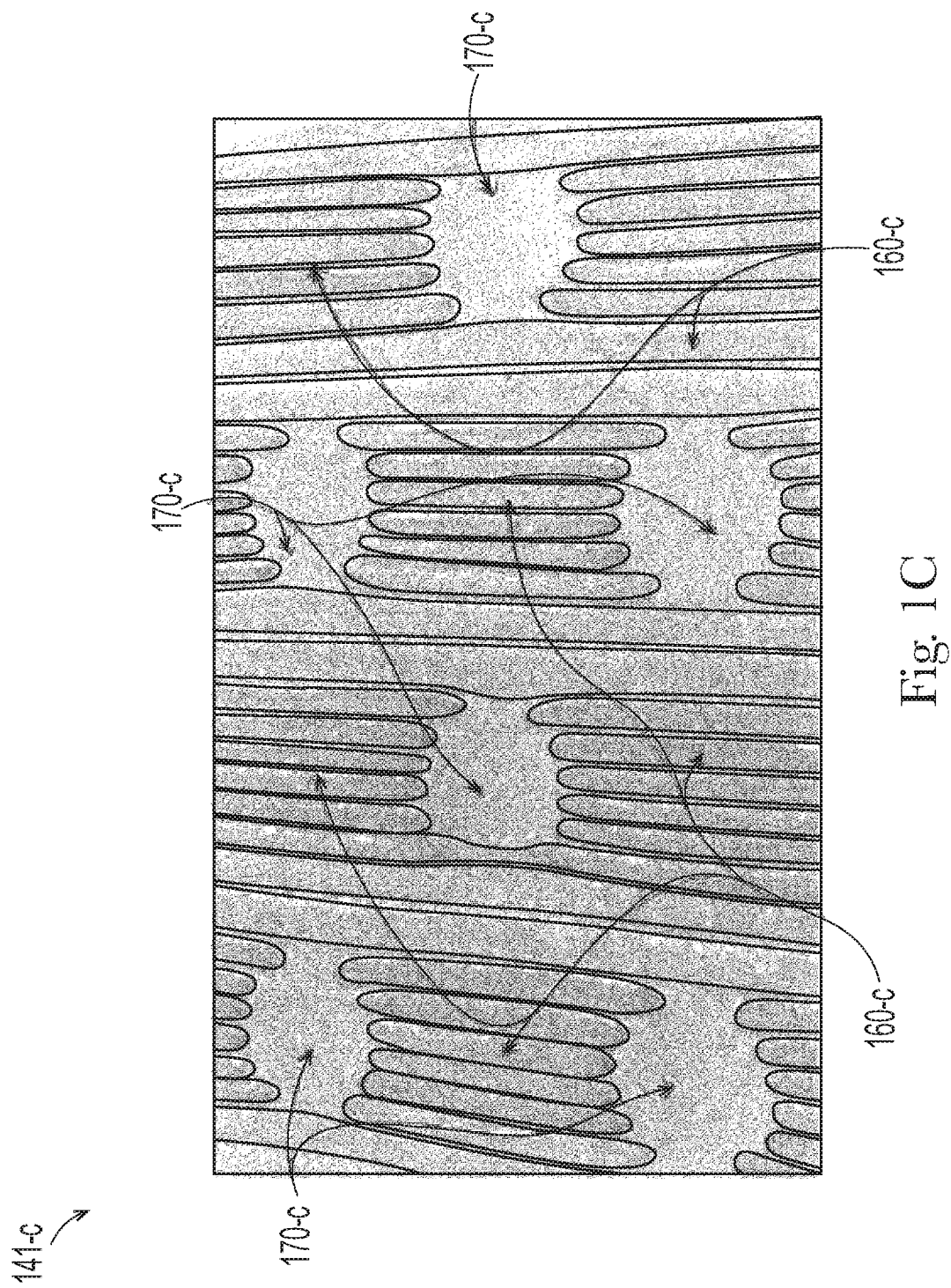
FIG. 1C is a photograph illustrating an enlarged top view of a portion of a patterned substrate that is configured in the same way as the patterned substrate of FIG. 1B.

FIG. 1C is a photograph illustrating an enlarged top view of a portion of a patterned substrate 141-c that is configured in the same way as the patterned substrate 141 of FIG. 1B, with like-numbered elements configured in the same way. The patterned substrate 141-c includes a first substrate region 160-c, which is configured in the same way as the first substrate region 160 of FIG. 1B. The patterned substrate 141-c also includes a second substrate region 170-c, which is configured in the same way as the second substrate region 170 of FIG. 1B.

FIG. 2A is a diagram illustrating an enlarged top view of a portion of a patterning surface 201 for making a patterned substrate, wherein the patterning surface 201 is configured in the same way as the patterned substrate 101 of FIG. 1A, with like-numbered elements configured in the same way, except as otherwise described below. In the patterning surface 201, adjacent rows of the open areas 231 are not spaced apart from each other, but instead are overlapping with each other; as a result, for the patterning surface 201, all portions of the first substrate region 220 are discontinuous in the secondary substrate direction 212.

FIG. 2B is a diagram illustrating an enlarged top view of a portion of a patterned substrate 241 made by the patterning surface 201 of FIG. 2A mated together with a second patterning surface, as described herein. The patterned substrate 241 is configured in the same way as the patterned substrate 141 of FIG. 1B, with like-numbered elements configured in the same way, except as otherwise described below. In the patterned substrate 241, adjacent rows of the unstretched portions 271 are not spaced apart from each other, but instead are overlapping with each other; as a result, for the patterned substrate 241, all portions of the first substrate region 260 are discontinuous in the secondary substrate direction 252.

Figure 2C:
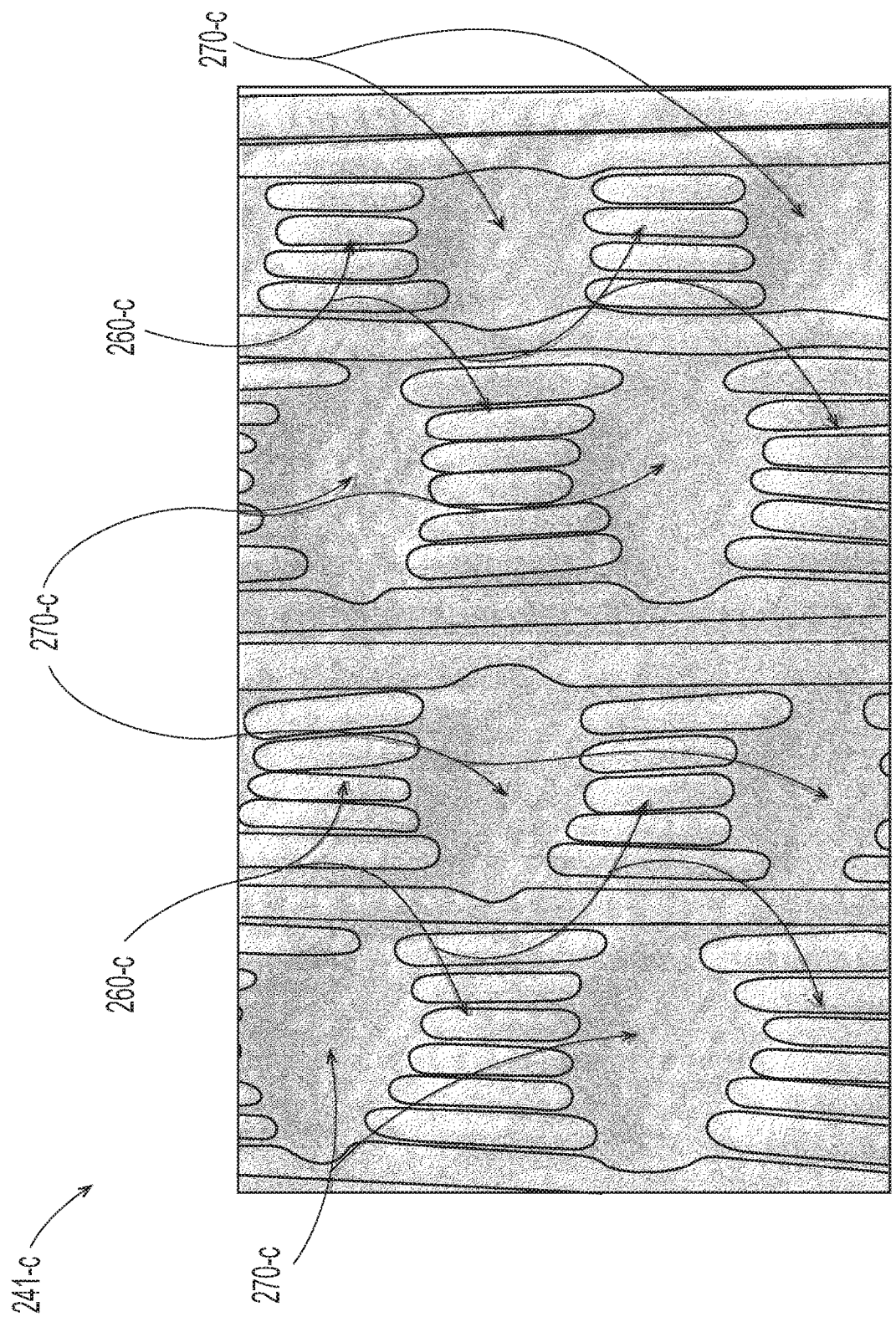
FIG. 2C is a photograph illustrating an enlarged top view of a portion of a patterned substrate that is configured in the same way as the patterned substrate of FIG. 2B.

FIG. 2C is a photograph illustrating an enlarged top view of a portion of a patterned substrate 241-c that is configured in the same way as the patterned substrate 241 of FIG. 2B, with like-numbered elements configured in the same way.

FIG. 3A is a diagram illustrating an enlarged top view of a portion of a patterning surface 301 for making a patterned substrate, wherein the patterning surface 301 is configured in the same way as the patterned substrate 101 of FIG. 1A, with like-numbered elements configured in the same way, except as otherwise described below. In the patterning surface 301, adjacent columns of the open areas 331 are not spaced apart from each other, but instead are overlapping with each other; as a result, for the patterning surface 301, all portions of the first substrate region 320 are discontinuous in the primary substrate direction 312.

FIG. 3B is a photograph of a cylindrical solid state formation roll 301-b having a patterning surface similar to the patterning surface of FIG. 3A disposed on its curved roll face.

FIG. 3C is a diagram illustrating an enlarged top view of a portion of a patterned substrate 341 made by the patterning surface 301 of FIG. 3A mated together with a second patterning surface, as described herein. The patterned substrate 341 is configured in the same way as the patterned substrate 141 of FIG. 1B, with like-numbered elements configured in the same way, except as otherwise described below. In the patterned substrate 341, adjacent columns of the unstretched portions 371 are not spaced apart from each other, but instead are overlapping with each other; as a result, for the patterned substrate 341, all portions of the first substrate region 360 are discontinuous in the secondary substrate direction 352.

The patterned substrate 341 includes a first substrate region 360 having a plurality of elongated, incrementally stretched corrugations 361. Some of the corrugations 361 have an overall orientation (taken end-to-end) disposed in the primary direction 351 (i.e. unangled) and some of the corrugations 361 have an overall orientation that is angled 5-45° with respect to the primary direction 351; some of the angled corrugations 361 are adjacent to one or more unangled corrugations 361. In various embodiments, the angled corrugations 361 can be angled at any integer angle from 5-45°, or any range formed by any of these angles, such as 5-30°, 5-20°, etc. Some of the corrugations 361 have an overall shape that is straight along part, parts, or all of the corrugation length and some of the corrugations 361 have an overall orientation that is at least partially curved along part, parts, or all of the corrugation length; some of the curved corrugations are adjacent to one or more straight corrugations.

Each of the corrugations 361 has a trough and a crest. The crests of the corrugations 361 include first crests 362-3 and second crests 362-4. The first crests 362-3 are disposed on the corrugations 361 that are unangled (with respect to the primary direction 351) and straight. The second crests 362-4 are disposed on the corrugations 361 that are angled (with respect to the primary direction 351); in various embodiments, the second crests 362-4 can be angled at any of the angles at which the angled corrugations 361 can be angled. Some of the second (angled) crests 362-4 are adjacent to one or more of the first (unangled) crests 362-3. Some of the second crests 362-4 have an overall shape that is straight and some of the second crests 362-4 have an overall shape that is at least partially curved; some of the curved crests are adjacent to one or more straight crests.

The first crests 362-3 and the second crests 362-4 are shown in FIG. 1B as dashed lines having various overall shapes and orientations. All of the first crests 362-3 and the second crests 362-2 are discontinuous, since they are interrupted by one of the unstretched portions 371 of the second substrate region 370. The first crests 362-3 and the second crests 362-4 are separated from each other by gaps of differing and varying sizes, wherein each gap has an overall width measured linearly in the secondary direction 352; this is further described and illustrated in connection with FIG. 3D.

Figure 3D:
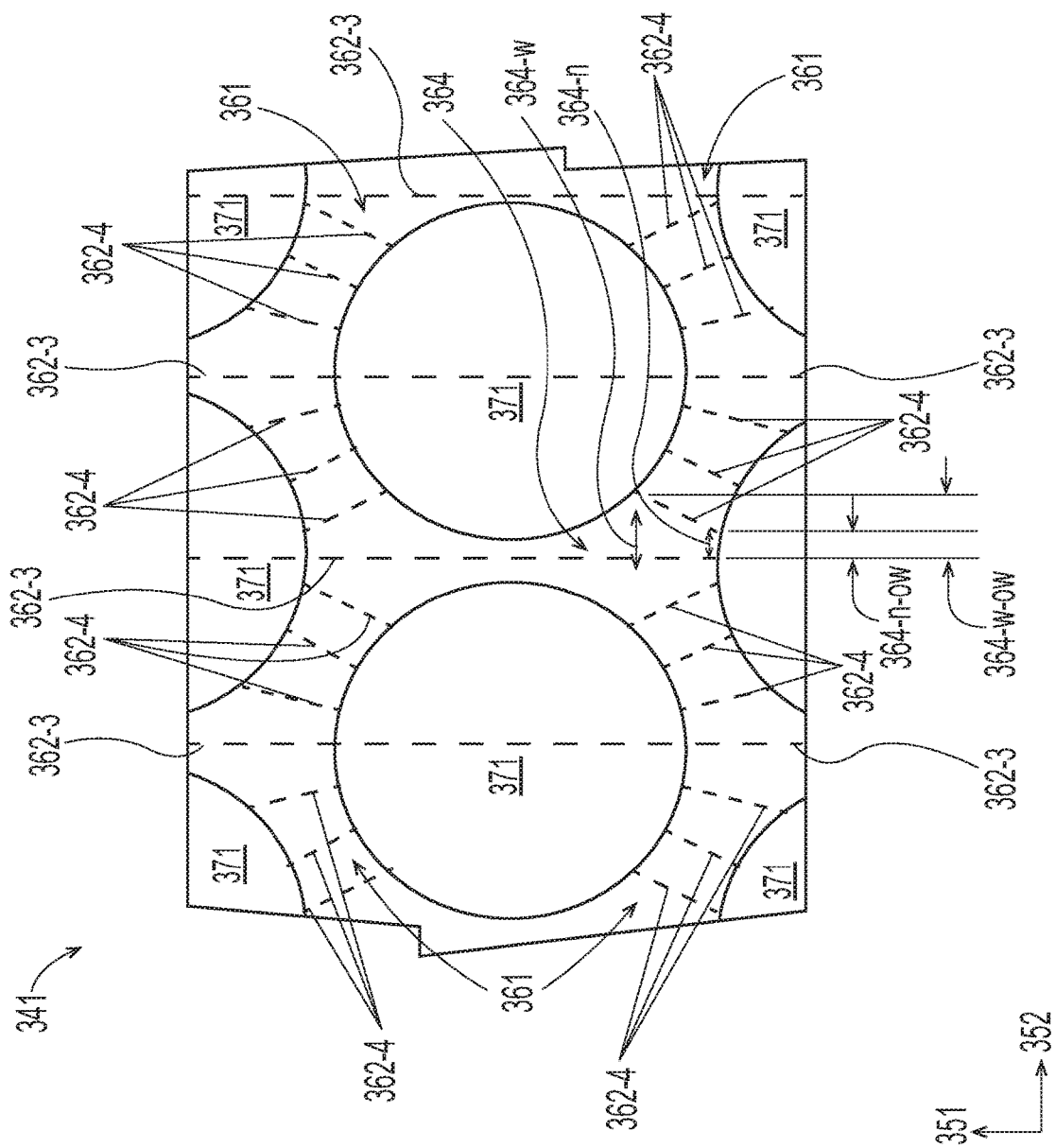
FIG. 3D is a diagram illustrating a further enlarged portion of FIG. 3C.

FIG. 3D is a diagram illustrating a further enlarged portion of the patterned substrate 341 of FIG. 3C. FIG. 3D illustrates the first crests 362-3 and the second crests 362-4 separated from each other by gaps of differing and varying sizes. One of the first crest 362-3, which in the middle of FIG. 3D, is adjacent to one of the second crests 362-4 (to the right, on the page), where the crests of these corrugations 361 are separated by a gap 364, which varies in overall width (measured linearly in the secondary direction 352) when taken at different locations along its overall length (substantially in the primary direction 351). The gap 364 has a first overall width 364-n-ow taken at a first location 364-n and a second overall width 364-w-ow taken at a second location 364-w, wherein the second overall width 364-w-ow is 25-300% greater than the first overall width 364-n-ow. While the gap 364 illustrates a particular gap of varying width, such variations also exist for most of the gaps disposed between crests of the corrugations 361 of the patterned substrate 341 of FIGS. 3C and 3D (and its alternative embodiments). In various embodiments, where a gap has a varying overall width, the second overall width can be 25-300% greater than the first overall width, or greater by any integer percentage between 25% and 300%, or any range formed by any of these values, such as 30-250%, 35-200%, 40-150%, 50-100%, etc.

Although the patterned substrate 341 is formed by the patterning surface 301, wherein all of the protrusions 321 are straight, oriented in the primary direction 311, and separated by uniform offset distances 321-od, many of the corrugations 361 of the patterned substrate 301 are curved and/or angled with adjacent crests separated by gaps of differing and/or varying size, because the pattern of unstretched portions 371 provides varying degrees of constraint to the first substrate region 360 when the substrate is incrementally mechanically stretched in the secondary direction 352, thus causing many of the corrugations 361 to take shapes and spacings that differ from shapes and spacings of the protrusions 321, such that many of the corrugations turn and/or curve off-axis, and a number of the gaps between their crests become relatively wider in size.

The corrugations 361, the gaps (such as 364), and the unstretched portions 371 affect the overall material properties of the patterned substrate 341. The unstretched portions 371 at least assist in maintaining the strength of the patterned substrate 341, since they are distributed in both the primary direction 351 and the secondary direction 352, over and across the patterned substrate 341. The unstrained portions of the corrugations 361 further assist in maintaining the strength of the patterned substrate 341, especially where some of the crests 362-3 and 362-4 of the corrugations 361 have opposing ends adjacent to different unstretched portions 371; the unstrained portions of these crests can act like ligaments that form pathways of local strength, which can help carry tensile loads between the unstretched portions 371. The strained portions of the corrugations 361, which are disposed in the gaps (such as 364) at least assist in improving the fluid permeability of pervious substrates (e.g. fibrous substrates, such as nonwovens). In particular, the relatively wider portions of the gaps (such as 364-w) have relatively larger strained portions, in which the patterned substrate 341 is thinned to an even greater degree, which allows fluids (e.g. liquids and/or gases) to pass through the patterned substrate 341 more easily. Since many of the corrugations turn and/or curve off-axis, and a number of the gaps between their crests become relatively wider in size, the fluid permeability of the patterned substrate 341 is improved over and across the patterned substrate 341. Thus, the patterned substrate 341 provides both tensile strength and fluid permeability, wherein each of these properties can be increased or decreased in various ways, as described herein.

FIG. 3E is a photograph illustrating an enlarged top view of a portion of a patterned substrate 341-c that is configured in the same way as the patterned substrate 341 of FIG. 3C, with like-numbered elements configured in the same way.

FIG. 4A is a diagram illustrating an enlarged top view of a portion of a patterning surface 401 for making a patterned substrate, wherein the patterning surface 401 is configured in the same way as the patterned substrate 101 of FIG. 1A, with like-numbered elements configured in the same way, except as otherwise described below. In the patterning surface 401, adjacent rows of the open areas 431 are not spaced apart from each other, but instead are overlapping with each other; as a result, for the patterning surface 401, all portions of the first substrate region 420 are discontinuous in the secondary substrate direction 412. And, in the patterning surface 401, adjacent columns of the open areas 431 are not spaced apart from each other, but instead are overlapping with each other; as a result, for the patterning surface 401, all portions of the first substrate region 420 are discontinuous in the primary substrate direction 412.

FIG. 4B is a diagram illustrating an enlarged top view of a portion of a patterned substrate 441 made by the patterning surface 401 of FIG. 4A mated together with a second patterning surface, as described herein. The patterned substrate 441 is configured in the same way as the patterned substrate 141 of FIG. 1B, with like-numbered elements configured in the same way, except as otherwise described below. In the patterned substrate 441, adjacent rows of the unstretched portions 471 are not spaced apart from each other, but instead are overlapping with each other; as a result, for the patterned substrate 441, all portions of the first substrate region 460 are discontinuous in the secondary substrate direction 452. And, in the patterned substrate 441, adjacent columns of the unstretched portions 471 are not spaced apart from each other, but instead are overlapping with each other; as a result, for the patterned substrate 441, all portions of the first substrate region 460 are discontinuous in the secondary substrate direction 452.

FIG. 4C is a photograph illustrating an enlarged top view of a portion of a patterned substrate 441-c that is configured in the same way as the patterned substrate 441 of FIG. 4B, with like-numbered elements configured in the same way.

Any of the substrates of the present disclosure can be made from various chemistries, including one or more of any kind of polymeric material such as polyethylene (including LLDPE, LDPE, and HDPE), polypropylene, nylon, ethyl vinyl acetate, and/or any other polymer suitable for making films, along with any additives (e.g. pigments/colorants) and/or modifiers (e.g. titanium dioxide) known in the art, in any combination (e.g. homopolymers, copolymers, blends, etc.) and in any form (e.g. single layers, laminates, layered structures, coextrusions, etc.) made by any kind of making process. Any of the patterned substrates of the present disclosure can be made from unpatterned substrates of various thicknesses, such films having an overall thickness of 5-2500 microns (0.2-98 mils), or any integer value between 5 and 2500 microns, or any range formed by any of these values, such as 5-100 microns (0.2-3.9 mils), 10-50 microns (0.39-2 mils), 10-30 microns (0.39-1.4 mils), etc.

The patterned substrates described herein provide both improved fluid handling properties and good tensile strength. These substrates include a first substrate region that is incrementally mechanically stretched with corrugations having strained and unstrained portions as well as a second substrate region having a plurality of discrete unstretched portions completely surrounded by the first substrate region. The unstretched portions at least assist in maintaining the strength of the patterned substrate, since they are distributed over and across the patterned substrate. The unstrained portions of the corrugations further assist in maintaining the strength of the patterned substrate. Where opposing ends of the corrugations are adjacent to different unstretched portions, the unstrained portions form pathways of local strength, which can help carry tensile loads between the unstretched portions. The strained portions of the corrugations at least assist in improving the fluid handling properties of pervious and/or absorptive substrates. Since the corrugations include larger strained portions in relatively wider gaps disposed at regular intervals, fluid permeability is improved over and across the patterned substrate. Thus, the patterned substrate provides both good tensile strength and improved fluid handling properties.

Definitions

As used herein, when the term "about" modifies a particular value, the term refers to a range equal to the particular value, plus or minus twenty percent (+/−20%). For any of the embodiments disclosed herein, any disclosure of a particular value, can, in various alternate embodiments, also be understood as a disclosure of a range equal to about that particular value (i.e. +/−20%).

As used herein, the term "absorbent article" includes disposable articles such as sanitary napkins, panty liners, tampons, interlabial devices, wound dressings, diapers, adult incontinence articles, wipes, and the like. At least some of such absorbent articles are intended for the absorption of body liquids, such as menses or blood, vaginal discharges, urine, and feces. Wipes may be used to absorb body liquids, or may be used for other purposes, such as for cleaning surfaces. Various absorbent articles described above will typically comprise a liquid pervious topsheet, a liquid impervious backsheet joined to the topsheet, and an absorbent core between the topsheet and backsheet. The nonwoven material described herein can comprise at least part of other articles such as scouring pads, wet or dry-mop pads (such as SWIFFER pads), and the like. It is contemplated that any embodiment of a patterned substrate disclosed herein can be used as a component material for any part of an absorbent article described herein or known in the art.

As used herein, the term "article" includes garbage bags, trash bags, and food storage bags. As used herein, when the term "approximately" modifies a particular value, the term refers to a range equal to the particular value, plus or minus fifteen percent (+/−15%). For any of the embodiments disclosed herein, any disclosure of a particular value, can, in various alternate embodiments, also be understood as a disclosure of a range equal to approximately that particular value (i.e. +/−15%).

As used herein, when the term "approximately" modifies a particular value, the term refers to a range equal to the particular value, plus or minus fifteen percent (+/−15%). For any of the embodiments disclosed herein, any disclosure of a particular value, can, in various alternate embodiments, also be understood as a disclosure of a range equal to approximately that particular value (i.e. +/−15%).

As used herein, the term "like-numbered" refers to similar alphanumeric labels for corresponding elements, as described below. Like-numbered elements have labels with the same last two digits; for example, one element with a label ending in the digits 20 and another element with a label ending in the digits 20 are like-numbered. Like-numbered elements can have labels with differing leading digit(s), wherein that leading digit(s) matches the number for its Figure; as an example, an element of FIG. 3 labeled 320 and an element of FIG. 4 labeled 420 are like-numbered. Like-numbered elements can have labels with a suffix (i.e. the portion of the label following the dash symbol) that is the same or possibly different (e.g. corresponding with a particular embodiment); for example, a first embodiment of an element in FIG. 3A labeled 320-a and a second embodiment of an element in FIG. 3B labeled 320-b, are like numbered.

As used herein, when the term "nearly" modifies a particular value, the term refers to a range equal to the particular value, plus or minus five percent (+/−5%). For any of the embodiments disclosed herein, any disclosure of a particular value, can, in various alternate embodiments, also be understood as a disclosure of a range equal to approximately that particular value (i.e. +/−5%).

As used herein, the term "solid state formation" refers to a process in which a mechanical force is exerted upon a material, which is in a solid state, wherein the force permanently deforms the material.

As used herein, when the term "substantially" modifies a particular value, the term refers to a range equal to the particular value, plus or minus ten percent (+/−10%). For any of the embodiments disclosed herein, any disclosure of a particular value, can, in various alternate embodiments, also be understood as a disclosure of a range equal to approximately that particular value (i.e. +/−10%).

METHODS/EXAMPLES

1. A method of making a patterned substrate, the method comprising:
   incrementally mechanically stretching a substrate to form the patterned substrate by using a first patterning surface mated with a second patterning surface, wherein:
      the first patterning surface includes:
         a primary surface direction and a secondary surface direction, which is perpendicular to the primary surface direction;
         a first surface region having a plurality of rigid protrusions, which are spaced apart from each other by one or more offset distances; and
         a second surface region having a plurality of open areas, each of which:
            is adjacent to four or more ends of the protrusions; and
            is completely surrounded by the protrusions of the first surface region; and
      the patterned substrate includes:
         a primary substrate direction, which is aligned with the primary surface direction during the incremental mechanical stretching;
         a secondary substrate direction, which is aligned with the secondary surface direction during the incremental mechanical stretching;
         a first substrate region having a plurality of corrugations formed by the protrusions of the first surface region; and
         a second substrate region having a plurality of unstretched portions corresponding with the open areas of the second surface region.

2. The method of Paragraph 1, wherein the open areas are arranged such that portions of the first surface region are continuous in the primary surface direction.

3. The method of Paragraph 2, wherein the open areas are arranged such that portions of the first surface region are continuous in the secondary surface direction.

4. The method of Paragraph 1, wherein the open areas are arranged such that all portions of the first surface region are discontinuous in the primary surface direction.

5. The method of Paragraph 4, wherein the open areas are arranged such that all portions of the first surface region are discontinuous in the secondary surface direction.

6. The method of any one of the previous Paragraphs, wherein:
   in the first surface region, the protrusions are spaced apart from each other by uniform offset distances; and
   in the first substrate region, each of the corrugations has a crest, wherein the crests of at least some of the corrugations are separated by gaps of differing size.

7. The method of Paragraph 6, wherein for at least some of the corrugations, when taken along a line parallel with the secondary substrate direction:
    a first adjacent gap has a first overall width; and
    a second adjacent gap has a second overall width;
    wherein the second overall width is 25-300% greater than the first overall width.

8. The method of Paragraph 7, wherein at the second overall width the second adjacent gap is disposed in a portion of the first substrate region that is continuous in the primary substrate direction.

9. The method of Paragraph 7 or 8, wherein the second adjacent gap has a substantially uniform overall width along at its overall length.

10. The method of any one of Paragraphs 7-9, wherein at the first overall width the first adjacent gap is disposed in a portion of the first substrate region that is discontinuous in the primary substrate direction.

11. The method of any one of Paragraphs 7-10, wherein the first adjacent gap has a substantially uniform overall width along its overall length.

12. The method of Paragraph 1, wherein:
    the protrusions are parallel with each other;
    the crests of at least some of the corrugations are separated by a gap having:
    a first overall width taken at a first location along its overall length; and
    a second overall width taken at a second location along its overall length;
    wherein the second overall width is 25-300% greater than the first overall width.

13. The method of Paragraph 1 or 12, wherein:
    the protrusions are oriented in the primary surface direction;
    at least some of the corrugations have an unangled crest with an overall orientation in the primary substrate direction;
    at least some of the corrugations have an angled crest with an overall orientation that is angled 5-45 degrees with respect to the primary substrate direction; and
    at least some of the angled crests are adjacent to an unangled crest.

14. The method of any one of Paragraphs 1, 12, or 13, wherein:
    the protrusions are linear protrusions;
    at least some of the corrugations have a crest with an overall shape that is straight;
    at least some of the corrugations have a crest with an overall shape that is at least partially curved; and
    at least some of the curved crests are adjacent to a straight crest.

15. The method of any one of the preceding Paragraphs, wherein at least some of the protrusions have opposing ends adjacent to different open areas.

16. The method of any one of the preceding Paragraphs, wherein the first surface region is a continuously connected surface region.

17. The method of any one of the preceding Paragraphs, wherein each of the open areas is free of protrusions at least around its entire periphery.

18. The method of any one of the preceding Paragraphs, wherein each of the open areas is free of protrusions throughout the entire area surrounded by its periphery.

19. The method of any one of the preceding Paragraphs, wherein each of the open areas is the same size and has the same overall shape.

20. The method of any one of the preceding Paragraphs, wherein the patterned substrate is formed from a material selected from the group including: film, nonwoven, airlaid fibrous structure, wetlaid fibrous structure, foam, and combinations of any of these.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A patterned substrate comprising:
    a primary substrate direction and a secondary substrate direction, which is perpendicular to the primary substrate direction;
    a first substrate region having a plurality of incrementally mechanically stretched corrugations, each of which has a crest; and
    a second substrate region having a plurality of discrete circular unstretched portions, each of which:
    is adjacent to four or more ends of the crests of the corrugations; and
    is completely surrounded by the first substrate region.

2. The patterned substrate of claim 1, wherein the unstretched portions are arranged such that portions of the first substrate region are continuous in the primary substrate direction.

3. The patterned substrate of claim 2, wherein the unstretched portions are arranged such that portions of the first substrate region are continuous in the secondary substrate direction.

4. The patterned substrate of claim 1, wherein the unstretched portions are arranged such that all portions of the first substrate region are discontinuous in the primary substrate direction.

5. The patterned substrate of claim 4, wherein the unstretched portions are arranged such that all portions of the first substrate region are discontinuous in the secondary substrate direction.

6. The patterned substrate of claim 1, wherein the crests of at least some of the corrugations are separated by gaps of differing sizes.

7. The patterned substrate of claim 6, wherein for at least some crests of the corrugations, when taken along a line parallel with the secondary substrate direction:
    a first adjacent gap has a first overall width; and a second adjacent gap has a second overall width;
wherein the second overall width is 25-300% greater than the first overall width.

8. The patterned substrate of claim 7, wherein at the second overall width the second adjacent gap is disposed in a portion of the first substrate region that is continuous in the primary substrate direction.

9. The patterned substrate of claim 7, wherein the second adjacent gap has a substantially uniform overall width along its overall length.

10. The patterned substrate of claim 7, wherein at the first overall width the first adjacent gap is disposed in a portion of the first substrate region that is discontinuous in the primary substrate direction.

11. The patterned substrate of claim 7, wherein the first adjacent gap has a substantially uniform overall width along its overall length.

12. The patterned substrate of claim 1, wherein the crests of at least some of the corrugations are separated by a gap having:
a first overall width taken at a first location along its overall length; and
a second overall width taken at a second location along its overall length;
wherein the second overall width is 25-300% greater than the first overall width.

13. The patterned substrate of claim 1, wherein:
at least some of the corrugations have an unangled crest with an overall orientation in the primary substrate direction;
at least some of the corrugations have an angled crest with an overall orientation that is angled 5-45 degrees with respect to the primary substrate direction; and
at least some of the angled crests are adjacent to an unangled crest.

14. The patterned substrate of claim 1, wherein:
at least some of the corrugations have a crest with an overall shape that is straight;
at least some of the corrugations have a crest with an overall shape that is at least partially curved; and
at least some of the curved crests are adjacent to a straight crest.

15. The patterned substrate of claim 1, wherein at least some of the crests have opposing ends adjacent to different unstretched portions.

16. The patterned substrate of claim 1, wherein the first substrate region is a continuously connected substrate region.

17. The patterned substrate of claim 1, wherein each of the unstretched portions is unstretched at least around its entire periphery.

18. The patterned substrate of claim 1, wherein each of the unstretched portions is unstretched throughout the entire area within its periphery.

19. The patterned substrate of claim 1, wherein each of the unstretched portions has the same size.

20. The patterned substrate of claim 1, wherein the substrate is formed from a material selected from the group including: film, nonwoven, airlaid fibrous structure, wetlaid fibrous structure, foam, and combinations of any of these.

* * * * *